(12) United States Patent
Liniger et al.

(10) Patent No.: US 9,113,647 B2
(45) Date of Patent: Aug. 25, 2015

(54) FLAVORED AND EDIBLE COLORED WAXES AND METHODS FOR PRECISION DEPOSITION ON EDIBLE SUBSTRATES

(75) Inventors: Scott Liniger, Maryville, IL (US); Andrea Hutchison, St. Louis, MO (US)

(73) Assignee: Sensient Colors LLC, St. Louis, MO (US)

( * ) Notice: Subject to any disclaimer, the term of this patent is extended or adjusted under 35 U.S.C. 154(b) by 557 days.

(21) Appl. No.: 12/550,146

(22) Filed: Aug. 28, 2009

(65) Prior Publication Data

US 2010/0055264 A1  Mar. 4, 2010

Related U.S. Application Data

(60) Provisional application No. 61/092,940, filed on Aug. 29, 2008.

(51) Int. Cl.
```
A23L 1/221    (2006.01)
A23L 1/00     (2006.01)
A23G 3/34     (2006.01)
A23G 3/28     (2006.01)
A23G 3/54     (2006.01)
A23G 4/20     (2006.01)
A23L 1/212    (2006.01)
A23L 1/27     (2006.01)
A23P 1/08     (2006.01)
```

(52) U.S. Cl.
CPC ............. *A23L 1/0055* (2013.01); *A23G 3/0097* (2013.01); *A23G 3/28* (2013.01); *A23G 3/54* (2013.01); *A23G 4/20* (2013.01); *A23L 1/2123* (2013.01); *A23L 1/221* (2013.01); *A23L 1/27* (2013.01); *A23P 1/085* (2013.01); *A23P 2001/089* (2013.01)

(58) Field of Classification Search
CPC ......... A23G 3/0097; A23G 3/28; A23G 3/54; A23G 1/0055
USPC ................................................ 426/303, 307
See application file for complete search history.

(56) References Cited

U.S. PATENT DOCUMENTS

| | | | |
|---|---|---|---|
| 1,931,409 A | 10/1933 | Humphrey | |
| 2,258,347 A | 10/1941 | Biggert, Jr. | |
| 2,385,613 A | 9/1945 | Davis | |
| 2,581,186 A | 1/1952 | Green | |
| 2,948,626 A | 8/1960 | Sanders, Jr. | |
| 2,982,234 A | 5/1961 | Ackley et al. | |
| 3,015,610 A | 1/1962 | Sanders, Jr. | |
| 3,052,552 A | 9/1962 | Koerner et al. | |
| 3,084,050 A | 4/1963 | Holland et al. | |
| 3,239,371 A | 3/1966 | Whitney et al. | |
| 3,258,347 A | 6/1966 | Brown | |
| 3,461,032 A | 8/1969 | Lichtenberger et al. | |
| 3,592,940 A | 7/1971 | Quesada | |
| 3,677,691 A | 7/1972 | Koch | |
| 3,694,237 A | 9/1972 | Piotrowski | |
| 3,796,814 A | 3/1974 | Cermak | |
| 3,806,607 A | 4/1974 | Whelan | |
| 4,021,252 A | 5/1977 | Banczak et al. | |
| 4,112,125 A | 9/1978 | Chesnut et al. | |
| 4,167,422 A | 9/1979 | Bellanca et al. | |
| 4,168,662 A | 9/1979 | Fell | |
| 4,177,075 A | 12/1979 | Mansukhani | |
| 4,230,687 A | 10/1980 | Sair et al. | |
| 4,233,328 A | 11/1980 | Dawson et al. | |
| 4,239,543 A | 12/1980 | Beasley | |
| 4,250,327 A | 2/1981 | Dawson et al. | |
| 4,307,117 A | 12/1981 | Leshik | |
| 4,316,918 A | 2/1982 | Bunes | |
| 4,327,077 A | 4/1982 | Puglia et al. | |
| 4,421,559 A | 12/1983 | Owatari | |
| 4,500,576 A | 2/1985 | Nicholson et al. | |
| 4,511,613 A | 4/1985 | Nicholson et al. | |
| 4,512,807 A | 4/1985 | Ogawa et al. | |
| 4,531,292 A | 7/1985 | Pasternak | |
| 4,548,825 A | 10/1985 | Voss et al. | |
| 4,576,825 A | 3/1986 | Tracy et al. | |
| 4,578,273 A | 3/1986 | Krubert | |
| 4,601,756 A | 7/1986 | Chiba et al. | |
| 4,620,876 A | 11/1986 | Fujii et al. | |

(Continued)

FOREIGN PATENT DOCUMENTS

| CH | 660 750 | 6/1987 |
|---|---|---|
| CH | 662 358 | 9/1987 |

(Continued)

OTHER PUBLICATIONS http://www.foodproductdesign.com/articles/2006/11/customizing-sweetness-profiles.aspx Customizing flavor profiles by Ronald Deis, Nov. 7, 2006, 5 pages.*
Glycerine profile, Feb. 10, 2004 obtained with verified date from http://web.archive.org/web/20040201000000*/http://www.mountainroseherbs.com/learn/vegetable-glycerine.php, 2 pages.*
Canadian Patent Office Action for Application No. 2438636 dated Dec. 21, 2010 (2 pages).
Chowhound, "Red velvet cake—without dairy?" dated 2005, retrieved from <chowhound.chow.com> on Feb. 16, 2012, pp. 1-4.
Emeril's Butter Cookies, Emeril Lagasse, 1999, retrieved from www.foodnetwork.com on Feb. 16, 2012, pp. 1-2.
"Taking Aluminum out of the Diet" website <www.home.earthlink.net/~joannefstruve/_wsn/page2.html> dated 2004, retrieved from <internetarchive.org> on Feb. 16, 2012, pp. 1-9.

(Continued)

*Primary Examiner* — Jyoti Chawla
(74) *Attorney, Agent, or Firm* — Michael Best & Friedrich LLP (57) ABSTRACT

A method of imparting flavor to an edible substrate by precision depositing a first food grade flavored wax onto a surface of an edible substrate. A method of providing a flavored image on an edible substrate by ink jet printing a food grade colored fluid on an edible substrate to create an image and applying a food grade flavored wax onto the edible substrate. A method of imparting flavor to an edible substrate by applying a food grade flavored wax onto the edible substrate and applying a food grade flavored fluid onto the edible substrate.

30 Claims, 5 Drawing Sheets

(56) References Cited

U.S. PATENT DOCUMENTS

| | | |
|---|---|---|
| 4,668,523 A | 5/1987 | Begleiter |
| 4,670,271 A | 6/1987 | Pasternak |
| 4,694,302 A | 9/1987 | Hackleman et al. |
| 4,761,180 A | 8/1988 | Askeland et al. |
| 4,780,326 A | 10/1988 | Stemmler et al. |
| 4,781,758 A | 11/1988 | Gendler et al. |
| 4,791,165 A | 12/1988 | Bearss et al. |
| 4,810,292 A | 3/1989 | Palmer et al. |
| 4,816,501 A | 3/1989 | Nomura et al. |
| 4,825,227 A | 4/1989 | Fischbeck et al. |
| 4,853,037 A | 8/1989 | Johnson et al. |
| 4,937,598 A | 6/1990 | Hine et al. |
| 4,985,260 A | 1/1991 | Niaura et al. |
| 5,002,789 A | 3/1991 | Graf et al. |
| 5,006,362 A | 4/1991 | Hilborn |
| 5,069,918 A | 12/1991 | Graf et al. |
| 5,073,392 A | 12/1991 | Atwell et al. |
| 5,073,399 A | 12/1991 | Vassiliou |
| 5,091,004 A | 2/1992 | Tabayashi et al. |
| 5,112,399 A | 5/1992 | Slevin et al. |
| 5,125,969 A | 6/1992 | Nishiwaki et al. |
| 5,147,673 A | 9/1992 | Schul |
| 5,156,675 A | 10/1992 | Breton et al. |
| 5,221,332 A | 6/1993 | Kohlmeier |
| 5,230,913 A | 7/1993 | Klemann |
| 5,230,918 A | 7/1993 | Anderson et al. |
| 5,265,315 A | 11/1993 | Hoisington et al. |
| 5,281,261 A | 1/1994 | Lin et al. |
| 5,300,310 A | 4/1994 | Elsen |
| 5,308,441 A | 5/1994 | Kern |
| 5,316,575 A | 5/1994 | Lent et al. |
| 5,362,504 A | 11/1994 | Kamper et al. |
| 5,393,333 A | 2/1995 | Trouve |
| 5,397,387 A | 3/1995 | Deng et al. |
| 5,409,715 A | 4/1995 | Meyers |
| 5,423,252 A | 6/1995 | Yamamoto et al. |
| 5,431,720 A | 7/1995 | Nagai et al. |
| 5,431,722 A | 7/1995 | Yamashita et al. |
| 5,433,960 A | 7/1995 | Meyers |
| 5,435,840 A | 7/1995 | Hilborn |
| 5,439,514 A | 8/1995 | Kashiwazaki et al. |
| 5,443,628 A | 8/1995 | Loria et al. |
| 5,453,122 A | 9/1995 | Lyon |
| 5,458,898 A | 10/1995 | Kamper et al. |
| 5,462,590 A | 10/1995 | Yui et al. |
| 5,466,287 A | 11/1995 | Lyon |
| 5,505,755 A | 4/1996 | Ernst |
| 5,522,922 A | 6/1996 | Furusawa et al. |
| 5,531,818 A | 7/1996 | Lin et al. |
| 5,534,281 A | 7/1996 | Pappas et al. |
| 5,580,372 A | 12/1996 | Gino et al. |
| 5,601,639 A | 2/1997 | Myers et al. |
| 5,611,851 A | 3/1997 | DeLuca et al. |
| 5,624,485 A | 4/1997 | Calhoun |
| 5,637,139 A | 6/1997 | Morelos et al. |
| 5,643,585 A | 7/1997 | Arad et al. |
| 5,659,346 A | 8/1997 | Moynihan et al. |
| 5,667,569 A | 9/1997 | Fujioka |
| 5,681,380 A | 10/1997 | Nohr et al. |
| 5,705,247 A | 1/1998 | Arai et al. |
| 5,716,253 A | 2/1998 | Aoki et al. |
| 5,757,391 A | 5/1998 | Hoisington |
| 5,780,060 A | 7/1998 | Levy et al. |
| 5,800,601 A | 9/1998 | Zou et al. |
| 5,882,707 A | 3/1999 | Grillo et al. |
| 5,935,310 A | 8/1999 | Engel et al. |
| 5,961,703 A | 10/1999 | Fraas |
| 5,972,085 A | 10/1999 | Simpson |
| 5,985,424 A | 11/1999 | DeMatte et al. |
| 6,020,397 A | 2/2000 | Matzinger |
| 6,058,843 A | 5/2000 | Young |
| 6,067,996 A | 5/2000 | Weber et al. |
| 6,109,722 A | 8/2000 | Underwood et al. |
| 6,120,821 A | 9/2000 | Goodin et al. |
| 6,123,848 A | 9/2000 | Quepons Dominguez et al. |
| 6,171,602 B1 | 1/2001 | Roman |
| 6,221,407 B1 * | 4/2001 | Gallart et al. .................. 426/90 |
| 6,231,654 B1 | 5/2001 | Elwakil |
| 6,231,896 B1 | 5/2001 | Ford et al. |
| 6,231,901 B1 | 5/2001 | Sharkasi et al. |
| 6,267,997 B1 | 7/2001 | Ream et al. |
| 6,277,498 B1 | 8/2001 | Endo et al. |
| 6,299,374 B1 | 10/2001 | Naor et al. |
| 6,346,237 B2 | 2/2002 | Lemann et al. |
| 6,352,713 B1 | 3/2002 | Kirschner et al. |
| 6,440,336 B1 | 8/2002 | Weinreich et al. |
| 6,461,652 B1 | 10/2002 | Henry et al. |
| 6,495,179 B1 | 12/2002 | Zietlow et al. |
| 6,509,045 B2 | 1/2003 | Henry et al. |
| 6,576,347 B1 | 6/2003 | Gomez Portela |
| 6,607,744 B1 | 8/2003 | Ribi |
| 6,616,958 B1 | 9/2003 | Stewart |
| 6,623,553 B2 | 9/2003 | Russell et al. |
| 6,627,212 B2 | 9/2003 | Uzunian et al. |
| 6,648,951 B2 | 11/2003 | Chen et al. |
| 6,652,897 B1 | 11/2003 | Stewart |
| 6,660,318 B2 | 12/2003 | Yoon et al. |
| 6,672,254 B1 | 1/2004 | Butts |
| 6,706,098 B2 | 3/2004 | Leu et al. |
| 6,747,072 B1 | 6/2004 | Siddiqui |
| 6,866,863 B2 | 3/2005 | Ribi |
| 6,881,430 B2 | 4/2005 | Køhler et al. |
| 6,887,504 B2 | 5/2005 | Palmer et al. |
| 6,893,671 B2 | 5/2005 | Ben-Yoseph et al. |
| 6,902,609 B2 | 6/2005 | Steffenino et al. |
| 7,022,331 B2 | 4/2006 | Theisen |
| 7,029,112 B2 | 4/2006 | Shastry et al. |
| 7,083,805 B2 | 8/2006 | Begleiter |
| 7,115,297 B2 | 10/2006 | Stillman |
| 7,122,215 B2 | 10/2006 | Ludwig et al. |
| 7,166,153 B2 | 1/2007 | Russell et al. |
| 7,247,199 B2 | 7/2007 | Baydo et al. |
| 7,261,769 B2 | 8/2007 | Bhaskaran et al. |
| 7,279,184 B2 | 10/2007 | Gow et al. |
| 7,279,189 B2 | 10/2007 | Lauro |
| 7,314,510 B2 | 1/2008 | Ueki |
| 7,431,956 B2 | 10/2008 | Baydo et al. |
| 7,431,957 B2 | 10/2008 | Baydo et al. |
| 7,842,319 B2 | 11/2010 | Baydo |
| 7,842,320 B2 | 11/2010 | Baydo |
| 2001/0038871 A1 | 11/2001 | Nardi |
| 2001/0046535 A1 | 11/2001 | Bowling |
| 2002/0008751 A1 | 1/2002 | Spurgeon et al. |
| 2002/0034475 A1 | 3/2002 | Ribi |
| 2002/0078858 A1 | 6/2002 | Chen et al. |
| 2002/0114863 A1 | 8/2002 | Ream et al. |
| 2002/0114878 A1 | 8/2002 | Ben-Yoseph et al. |
| 2002/0135651 A1 | 9/2002 | Spurgeon et al. |
| 2002/0172721 A1 | 11/2002 | Boulos et al. |
| 2002/0192352 A1 | 12/2002 | Dar |
| 2003/0031768 A1 | 2/2003 | Dalziel et al. |
| 2003/0037700 A1 | 2/2003 | Leu et al. |
| 2003/0091700 A1 | 5/2003 | Zietlow et al. |
| 2003/0097949 A1 | 5/2003 | Candler et al. |
| 2003/0101902 A1 | 6/2003 | Reitnauer et al. |
| 2003/0103905 A1 | 6/2003 | Ribi |
| 2003/0161913 A1 | 8/2003 | Stewart |
| 2003/0198720 A1 | 10/2003 | Stewart |
| 2004/0004649 A1 | 1/2004 | Bibl et al. |
| 2004/0013778 A1 | 1/2004 | Ackley, Jr. et al. |
| 2004/0021757 A1 | 2/2004 | Shastry et al. |
| 2004/0043134 A1 | 3/2004 | Corriveau et al. |
| 2004/0050289 A1 | 3/2004 | Russell et al. |
| 2004/0086603 A1 | 5/2004 | Shastry et al. |
| 2004/0086605 A1 | 5/2004 | Sox |
| 2004/0087669 A1 | 5/2004 | Hausmanns et al. |
| 2004/0096569 A1 | 5/2004 | Barkalow et al. |
| 2004/0101615 A1 | 5/2004 | Barker et al. |
| 2004/0120991 A1 | 6/2004 | Gardner et al. |
| 2004/0131730 A1 | 7/2004 | Dalziel et al. |
| 2004/0170725 A1 | 9/2004 | Begleiter |
| 2004/0175463 A1 | 9/2004 | Shastry et al. |
| 2004/0213875 A1 | 10/2004 | Stewart |
| 2005/0003056 A1 | 1/2005 | Romanach et al. |

(56) References Cited

U.S. PATENT DOCUMENTS

| | | | |
|---|---|---|---|
| 2005/0008735 A1 | 1/2005 | Pearce | |
| 2005/0058749 A1 | 3/2005 | Romanach et al. | |
| 2005/0058753 A1 | 3/2005 | Romanach | |
| 2005/0061184 A1 | 3/2005 | Russell et al. | |
| 2005/0069612 A1 | 3/2005 | Wen et al. | |
| 2005/0147724 A1 | 7/2005 | Schweinfurth | |
| 2005/0157148 A1 | 7/2005 | Baker et al. | |
| 2005/0163898 A1 | 7/2005 | Romanach et al. | |
| 2005/0230420 A1 | 10/2005 | Smith et al. | |
| 2005/0255202 A1 | 11/2005 | Dalziel et al. | |
| 2005/0257716 A1 | 11/2005 | Mazzella et al. | |
| 2006/0019006 A1 | 1/2006 | Bates | |
| 2006/0038866 A1 | 2/2006 | Wen et al. | |
| 2006/0051425 A1 | 3/2006 | Kvitnitsky et al. | |
| 2006/0051458 A1 | 3/2006 | Fornaguera | |
| 2006/0068019 A1 | 3/2006 | Dalziel et al. | |
| 2006/0110551 A1 | 5/2006 | Shastry et al. | |
| 2006/0151533 A1 | 7/2006 | Simunovic et al. | |
| 2006/0182691 A1 | 8/2006 | Besse et al. | |
| 2006/0182856 A1 | 8/2006 | Ornelaz | |
| 2006/0228451 A1 | 10/2006 | Martin | |
| 2006/0251687 A1 | 11/2006 | Lapidot et al. | |
| 2006/0275528 A1 | 12/2006 | Collins et al. | |
| 2006/0275529 A1 | 12/2006 | Woodhouse et al. | |
| 2007/0048407 A1 | 3/2007 | Collins et al. | |
| 2007/0071680 A1 | 3/2007 | Ribi | |
| 2007/0098859 A1 | 5/2007 | Shastry et al. | |
| 2008/0032011 A1 | 2/2008 | Liniger | |
| 2008/0075830 A1* | 3/2008 | Wen et al. | 426/650 |
| 2009/0186121 A1 | 7/2009 | Hutchison et al. | |
| 2009/0269447 A1 | 10/2009 | Brimmer | |
| 2009/0298952 A1 | 12/2009 | Brimmer | |
| 2010/0047415 A1 | 2/2010 | Baydo et al. | |

FOREIGN PATENT DOCUMENTS

| | | |
|---|---|---|
| CN | 1158346 | 9/1997 |
| EP | 0340776 | 11/1989 |
| EP | 0475075 | 3/1992 |
| EP | 0705890 | 4/1996 |
| EP | 1611798 | 1/2006 |
| GB | 2277094 | 10/1994 |
| JP | 58052375 | 3/1983 |
| JP | 59042864 | 3/1984 |
| JP | 61036364 | 2/1986 |
| JP | 62239955 | 10/1987 |
| JP | 63063363 | 3/1988 |
| JP | 1034263 | 2/1989 |
| JP | 1035232 | 2/1989 |
| JP | 3195462 | 8/1991 |
| JP | 7008211 | 1/1995 |
| JP | 8308532 | 11/1996 |
| JP | 9084566 | 3/1997 |
| JP | 2000041621 | 2/2000 |
| JP | 2000302987 | 10/2000 |
| JP | 2003535923 | 12/2003 |
| JP | 2004073609 | 3/2004 |
| JP | 2004246255 | 9/2004 |
| JP | 2004246256 | 9/2004 |
| JP | 2005253393 | 9/2005 |
| JP | 2006311850 | 11/2006 |
| KR | 2002000069 A * | 1/2002 |
| WO | WO 90/12513 | 11/1990 |
| WO | WO 92/14795 | 9/1992 |
| WO | WO 95/01735 | 1/1995 |
| WO | WO 95/27758 A | 10/1995 |
| WO | WO 97/17409 | 5/1997 |
| WO | WO 97/35933 | 10/1997 |
| WO | WO 00/03609 | 1/2000 |
| WO | WO 00/25603 | 5/2000 |
| WO | WO 01/94116 | 12/2001 |
| WO | WO 02/085995 | 10/2002 |
| WO | WO 2004/003089 | 1/2004 |
| WO | WO 2004/012518 | 2/2004 |
| WO | WO 2004/080191 | 9/2004 |
| WO | WO 2005/002360 | 1/2005 |
| WO | WO 2005/006884 | 1/2005 |
| WO | WO 2005/027655 | 3/2005 |
| WO | WO 2005/079223 | 9/2005 |
| WO | WO 2005/086655 | 9/2005 |
| WO | WO 2005/113693 | 12/2005 |
| WO | WO 2005/122784 | 12/2005 |
| WO | WO 2006/023615 | 3/2006 |
| WO | WO 2006/086780 | 8/2006 |
| WO | WO 2006/086781 | 8/2006 |
| WO | WO 2006/121936 | 11/2006 |
| WO | WO 2007/005063 | 1/2007 |
| WO | WO 2007/109754 | 9/2007 |
| WO | WO 2007/115050 | 10/2007 |
| WO | WO 2007/130983 | 11/2007 |

OTHER PUBLICATIONS

Vatai, T. et al., "Extraction and formulation of anthocyanin-concentrates from grape residues," 2008, The Journal of Supercritical Fluids 45(1):32-36.
United States Patent Office Action for U.S. Appl. No. 12/429,735 dated Mar. 1, 2012 (8 pages).
United States Patent Office Action for U.S. Appl. No. 12/437,219 dated Feb. 24, 2012 (24 pages).
Chigurupati, N. et al., "Evaluation of red cabbage dye as a potent natural color for pharmaceutical use," Int. J. Pharm. (2002) 241:293-299.
Merriam-Webster's Collegiate Dictionary, Entries for "Dye, natural, nutraceutical, plate and salt," (2004) pp. 389, 826, 853, 949 and 1098, respectively (pp. 1-24 as supplied).
Rogers, M.A. et al., "A preliminary study of dietary aluminum intake and risk of Alzheimer's disease," British Geriatrics Society, Age and Ageing (1999) 28:205-209.
Wrolstad, R.E., "Anthocyanin pigments—bioactivity and coloring properties," Institute of Food Technologists, J. Food Sci.: Food Chem. Toxicol. (2004) 69(5):C419-421.
United States Patent Office Action for U.S. Appl. No. 12/299,146 dated Dec. 27, 2011 (8 pages).
United States Patent Office Action for U.S. Appl. No. 12/437,219 dated Oct. 12, 2011 (16 pages).
United States Patent Office Action for U.S. Appl. No. 12/429,735 dated Oct. 3, 2012 (8 pages).
Occidental Flavors Inc. "The Language of Flavor"; retrieved from <shinseicosmetics.net/OFI/flavors.html> on May 28, 2013, pp. 1-16.
United States Patent Office Action for U.S. Appl. No. 12/437,219 dated Feb. 6, 2013 (22 pages).
Reade Advanced Materials information for "Silica Power, Food Grade (FCC)" including synonyms; retrieved from <www.reade.com> on Jan. 28, 2013, pp. 1-3.
Straight Dope "Sand in my chili powder?", dated Jul. 25, 2002; retrieved from <boards.straightdope.com> on Jan. 28, 2013, p. 1.
EVONIK Industries product for "SIPERNAT® and AEROSIL® in the Food Industry"; retrieved from <www.sipernat.com> Jan. 28, 2013, pp. 1-8.
PPG Silica Products information for "Fio-Gard™ SP Flow Conditioning Silica", dated 2011, pp. 1-2.
Huber Materials "Anti-Caking and Free-Flow Agents for the Food Industry", retrieved from <www.hubermaterials.com> on Jan. 28, 2013, pp. 1-2.
Wu, Xianli et al.; "Concentrations of Anthocyanins in Common Foods in the United States and Estimation of Normal Consumption", 2006, American Chemical Society; Journal of Agricultural and Food Chemistry, vol. 54, No. 11, pp. 4069-4075.
United States Patent Office Final Rejection for U.S. Appl. No. 12/429,735 dated Apr. 8, 2013 (10 pages).
Pothakamury, et al, Fundamental aspects of controlled release in foods, Trends Food Sci. and Technol., 6 (1995), pp. 397-406.
Zuidam et al., Overview of Microencapsulates for Use in Food Products or Processes and Methods to Make Them, Chapter 2, Encapsulation Technologies for Active Food Ingredients and Food Processing, Springer, Hardcover, 2010.
United States Patent Office Final Rejection for U.S. Appl. No. 12/299,146 dated Mar. 27, 2013 (35 pages).

(56) References Cited

OTHER PUBLICATIONS

Carr et al., Textile Ink Jet Performance and Print Quality Fundamentals, National Textile Center Annual Report p. 1-10 (Nov. 2001).
Londo, Pulp & Paper Magazine: On-Machine Coating of Inkjet Paper Possible with Modified Kaolin og, 1-13 (May 2000).
Derksen et al., Spray Delivery to Nursery Trees by Air Curtain and Axial Fan Orchard Sprayers, vol. 22(1) Environ. Hort. p. 17-22. (Mar. 2004).
Salyani et al., Deposition Efficiency of Different Droplet Sizes for Citrus Spraying, vol. 30(6):, p. 1595-1599 (Nov.-Dec. 1987).
Stahl, Preparation of Granules by Spray Drying, European Pharmaceutical Review, p. 1-6 (Jan. 2000).
Brazilian Patent Office Action for Application No. PI0511926-0 dated Nov. 10, 2013 (5 pages).
JECFA Food Additive Index; Online Edition: "Combined Compendium of Food Additive Specifications"; accessed on Nov. 21, 2013 at http://www.fao.org/ag/agn/jecfa-additives/index.html; 8 pages.
JECFA Flavourings Index; Online Edition: "Specifications for Flavourings"; accessed on Nov. 21, 2013 at http://www.fao.org/ag/agn/jecfa-flav/index.html; 38 pages.
United States Patent Office Action for U.S. Appl. No. 12/429,735 dated Apr. 23, 2014 (10 pages).
Aldrich Chemical, "Silsesquioxanes, Bridging the Gap Between Polymers and Ceramics," Chemfiles (2001) 1(6):1-14.
Database WPI Week 2001, Derwent Publications Ltd., London, GB; AN 2001-409143 (XP002348407), Li, Y: "High grade edible paint mimeograph," & CN 1 158 346 A (Li Y) (Sep. 3, 1997) abstract.
Ingredient Statement: 6# Refined Glaze in Butylac; Origination Date: Jan. 9, 2004.
Ingredient Statement: 8# Esterified Shellac M-4; Origination Date Jan. 9, 2004.
Ingredient Statement: Certified R-100 Refined Grade Shellac; Origination Date Jun. 25, 2001 (client sent; added per LMF).
Ingredient Statement: Mantrolac R-100 in Propylene Glycol FG; Origination Date: Jan. 12, 2004.
Material Safety Data Sheet, Certified R-100 Refined Bleached Shellac, Mantrose-Haeuser Company; Origination Date: May 1, 2001 (client sent; added per LMF).
Stepan Company, "Stepan® EDS" Product Bulletin (2006) 2 pages.
Technical Information: 8# White French Varnish M-4. Mantrose-Bradshaw-Zinsser Group, Origination date Jan. 9, 2004.
Technical Information: Certified R-100 Refined Bleached Shellac. Mantrose-Bradshaw-Zinsser Group, Origination date Jan. 9, 2004.
Tolliver-Nigro, "Taking the Sting Out of No-Tox," Ink Maker (2003).
Univar Food Ingredients, "Hydrocolloids," (2005) 2 pages.
Universal Stenciling and Marking Systems, Inc., "USMR Micro-Spray Markers All Models Owner's Manual," St. Petersburg, FL (Sep. 2, 2004) 1-29.
Van Nieuwenhuyzen, W., "Lecithin Production and Properties," J. Am. Oil Chem. Soc. (1976) 53:425-427.
Yinghua, S., "Synthesis of propylene glycol," Shenyang Chemical Technology (1996) 3:35.
Chinese Patent Office Action for Application No. 200580026607.6 dated Apr. 16, 2009 (12 pages).
European Patent Office Action for Application No. 05760453 dated Jul. 7, 2008 (3 pages).
European Patent Office Action for Application No. 06735439.9 dated Apr. 1, 2008 (4 pages).
European Patent Office Action for Application No. 06735439.9 dated Dec. 1, 2008 (2 pages).
European Patent Office Search Report for Application No. 10011401.6 dated Dec. 27, 2010 (5 pages).
European Patent Office Search Report for Application No. 10011405.7 dated Dec. 27, 2010 (6 pages).
International Search Report and Written Opinion for Application No. PCT/US2005/020598 dated Oct. 20, 2005 (8 pages).
International Search Report and Written Opinion for Application No. PCT/US2006/05777 dated Sep. 29, 2006 (6 pages).
International Search Report and Written Opinion for Application No. PCT/US2007/067940 dated Jun. 23, 2008 (8 pages).
International Search Report and Written Opinion for Application No. PCT/US2007/072416 dated Jun. 28, 2007 (14 pages).
Japanese Patent Office Action for Application No. 2007-527783 dated Jun. 10, 2009 (3 pages) translation only.
United States Office Action for U.S. Appl. No. 10/601,064 dated Mar. 27, 2006 (15 pages).
United States Office Action for U.S. Appl. No. 10/601,064 dated Jul. 24, 2007 (13 pages).
United States Patent Office Action for U.S. Appl. No. 12/201,569 dated Apr. 6, 2010 (6 pages).
United States Office Action for U.S. Appl. No. 11/149,660 dated Jul. 16, 2007 (13 pages).
United States Patent Office Action for U.S. Appl. No. 12/202,521 dated Apr. 1, 2010 (5 pages).
United States Patent Office Action for U.S. Appl. No. 11/994,164 dated Dec. 8, 2010 (12 pages).
United States Office Action for U.S. Appl. No. 11/770,678 dated May 29, 2009 (34 pages).
United States Patent Office Action for U.S. Appl. No. 11/770,678 dated Apr. 29, 2010 (18 pages).

* cited by examiner

FLAVORED AND EDIBLE COLORED WAXES AND METHODS FOR PRECISION DEPOSITION ON EDIBLE SUBSTRATES

CROSS-REFERENCE TO RELATED APPLICATIONS

This application claims priority under 35 U.S.C. §119(e) to U.S. Provisional Patent Application No. 61/092,940, filed Aug. 29, 2008. The entire contents of this application are hereby incorporated by reference in their entirety.

BACKGROUND

Precision deposition has the potential to revolutionize the food industry by providing a novel way to apply edible flavored and colored waxes to the surfaces of food items. Specifically, this invention provides an economical and efficient way to impart flavor to edible substrates using precision deposition technology.

SUMMARY

In one aspect, the invention may provide a method of imparting flavor to an edible substrate that may include precision depositing a first food grade flavored wax onto a surface of an edible substrate.

In another aspect, the invention may provide a method of providing a flavored image on an edible substrate that may include ink jet printing a food grade colored fluid on an edible substrate to create an image and applying a food grade flavored wax onto the edible substrate.

In a further aspect, the invention may provide a method of imparting flavor to an edible substrate that may include applying a food grade flavored wax onto the edible substrate and applying a food grade flavored fluid onto the edible substrate.

DETAILED DESCRIPTION

Described below are food grade flavored waxes for use in depositing on edible substrates, methods for applying the food grade flavored waxes directly to edible substrates, and edible substrates having the food grade flavored waxes applied thereto. The food grade flavored waxes are typically made from food grade flavors and waxes and optionally colors, sweeteners, acids, or sensation flavors. The food grade flavored waxes have characteristics that render them suitable for depositing directly onto the surfaces of a variety of edible substrates. Formulations of the present invention should be or have at least one of the following: food grade ingredients; compatibility with the food surfaces onto which they will be applied; and properties (e.g., viscosities, surface tensions, smear resistance, solubilities, drying times) that make them suitable for use with precision deposition technology.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It also is understood that any numerical range recited herein includes all values from the lower value to the upper value. For example, if a concentration range is stated as 1% to 50%, it is intended that values such as 2% to 40%, 10% to 30%, or 1% to 3%, etc., are expressly enumerated in this specification. These are only examples of what is specifically intended, and all possible combinations of numerical values between and including the lowest value and the highest value enumerated are to be considered to be expressly stated in this application.

As used herein, "food grade" means that up to specified amounts of the food grade flavored waxes or individual ingredients making up the food grade flavored wax can be ingested by a human without generally causing deleterious health effects. Therefore, in order to meet the standard of a "food grade" flavored wax, the food grade flavored wax should be free or substantially free of ingredients that generally cause deleterious health effects when ingested by a human. When such ingredients are present, e.g., in trace amounts through contamination, those ingredients should be present in amounts below those that would result in deleterious health effects. Examples of food grade ingredients include those ingredients "generally recognized as safe" ("GRAS") by the United States Food and Drug Administration ("FDA") and flavors approved by the FDA for use in foods for human consumption. In particular, food safe ingredients include those ingredients listed as approved under 21 C.F.R. §§172.510, 172.515, 172.520, 172.530, 172.535, 172.575, 172.580 and 172.585.

A wide variety of edible substrates may be employed. As used herein, "edible substrate" or "substrate" includes any material suitable for consumption that is capable of having a flavor disposed thereon. Examples of edible substrates onto which the food grade flavored waxes may be deposited include snack chips (e.g., sliced potato chips), fabricated snacks (e.g., fabricated chips such as tortilla chips, potato chips, potato crisps), extruded snacks, cookies, cakes, chewing gum, candy, various bread products (e.g., biscuits, toast, buns, bagels, and tortillas), fruit, dried fruit, beef jerky, crackers, pasta, hot dogs, sliced meats, cheese, pancakes, waffles, dried fruit film, breakfast cereals, toaster pastries, ice cream cones, ice cream, gelatin, ice cream sandwiches, ice pops, yoghurt, desserts, cheese cake, pies, cup cakes, chocolate, English muffins, pizza, pies, meat patties, fish sticks, hard candy, iced cakes and cookies, marshmallows, muffins, pellet gum, pretzels, processed fruit snacks, pudding, taffy, and vanilla wafers. Examples of edible substrates may also include, but are not limited to, pharmaceutical applications and pet food applications (e.g. pet treats, snacks, and food).

Although any substrate may be combined with any food grade flavored wax, some substrates may be more compatible than others with a particular food grade flavored wax.

The surface of the edible substrate onto which the food grade flavored waxes are applied may be a porous surface. As used herein, the term "porous surface" is intended to include any surface having sufficient porosity to allow the food grade flavored waxes to be at least partially absorbed. The food grade flavored waxes may also be applied to nonporous edible surfaces, including gel capsules, gelatin-based roll-ups and other semi to nonporous materials. No additional drying is necessary for the application of the food grade flavored waxes on edible substrates. The wax may freeze upon contact with the edible substrate and bind to the surface of the substrate. The freeze may occur rapidly. Although the above substrates are typically associated with human consumption, it should be understood that any substrate fit for human or animal consumption may be used. Additional examples may include dog bones and dog biscuits.

Food grade flavored waxes may include food grade waxes, which may include complex mixtures of alcohols, acids, and esters formed from long-chain fatty acids and low-chain alcohols, as well as long-chain alkanes, and may generally be plastic solids at room temperature. The food grade waxes may comprise at least one of natural, vegetable, and synthetic waxes. Examples of food grade waxes may include, without limitation, astor wax, beeswax (white), beeswax (yellow), candelilla wax, carnauba wax, castor wax, glyco wax, paraffin wax, petroleum wax, rice bran wax, stearin, stearic acid, erythritol distearate, Stepan® EDS (available from Stepan Company of Maywood, N.J.), or a combination thereof. Stepan® EDS (stearic acid esters of erythritol) is a high melt lipid with a melting point of 80° C.

Optionally, food grade thickeners such as sugar syrup, potassium tricitrate, hydroxypropyl methylcellulose, carboxymethylcellulose (e.g., Akucell AF1705 from Akzo Nobel), hydroxypropylcellulose (e.g., Klucel EF from Hercules Inc.), polyglycerol esters (e.g. Santone), xanthan gum, gellan gum, Methocel®, Carrageenan (kappa, iota, lamda), pectins, locust bean, guar, gum Arabic, alginates, gelatin, and microcrystalline cellulose may be used in addition to the food grade waxes or as a partial or complete replacement for the food grade waxes in the food grade flavored wax. Many of these food grade thickeners, or hydrocolloids, are available from Univar USA Inc., Kirkland, Wash.

The food grade flavored wax may include (by weight) from about 1% to about 99%, particularly from about 10% to about 90%, and more particularly from about 20% to about 80% of food grade wax.

The food grade flavored wax may include (by weight) from about 5% to about 70% of additional components such as flavors and colors.

The food grade flavored wax may also include a sweetener. Examples of sweeteners may include, without limitation, sugar, artificial sweetener, and combinations thereof.

The food grade flavored wax may further comprise an acid.

The food grade flavors used to produce the food grade flavored waxes may be synthetic or artificial flavors, natural flavors or any mixture thereof. The food grade flavors may include any flavors which are soluble in oil, water, IPA, benzo alcohol, triacidin, and/or triathyl citrate. Examples of suitable flavors include almond, amaretto, apple, green apple, apple-cherry-berry, apple-honey, apricot, bacon, balls of fire, banana, barbeque, beef, roast beef, beef steak, berry, berry blue, birch beer/spruce beer, blackberry, bloody mary, blueberry, boysenberry, brandy, bubble bum, butter, butter pecan, buttermilk, butterscotch, candy corn, cantaloupe, cantaloupe lime, caramel, carrot, cassia, caviar, celery, cereal, champagne, cherry, cherry cola, cherry maraschino, wild cherry, black cherry, red cherry, cherry-cola, chicken, chocolate, chocolate almond, cinnamon spice, citrus, citrus blend, citrus-strawberry, clam, cocoa, coconut, toasted coconut, coffee, coffee almond, cola, cola-vanilla, cookies & cream, cool, cotton candy, cranberry, cranberry-raspberry, cream, cream soda, dairy type cream, crème de menthe, cucumber, black currant, dulce de leche, egg nog, pork fat, type fat, anchovy fish, herring fish, sardine fish, frankfurter, fiery hot, fried garlic, sauteed garlic, gin, ginger ale, ginger beer, graham cracker type, grape, grape grapefruit, grapefruit-lemon, grapefruit-lime, grenadine, grill, guarana, guava, hazelnut, honey, hot, roasted honey, ice cream cone, jalapeno, key lime, kiwi, kiwi-banana, kiwi-lemon-lime, kiwi-strawberry, kola champagne, lard type, lemon, lemon custard, lemonade, pink lemonade, lemon-lime, lime, malt, malted milk, mango, mango-pineapple, maple, margarita, marshmallow, meat type, condensed milk, cooked milk, mint, mirepoix, mocha, mochacinna, molasses, mushroom, sautéed mushroom, muskmelon, nectarine, neopolitan, green onion, sautéed onion, orange, orange cordial, orange creamsicle, orange crème, orange peach mango, orange strawberry banana, creamy orange, mandarin orange, orange-passion-guava, orange-pineapple, papaya, passion fruit, peach, peach-mango, peanut, roasted peanut, pear, pecan danish type, pecan praline, pepper, peppermint, pimento, pina colada, pina colada/pineapple-coconut, pineapple, pineapple-orange, pistachio, pizza, pomegranate, pork fat type, baked potato, prune, punch, citrus punch, tropical punch, cherry fruit punch, grape punch, raspberry, black raspberry, blue raspberry, red raspberry, raspberry-blackberry, raspberry-ginger ale, raspberry-lime, roast type, root beer, rum, sangria, sarsaparilla, sassafras, sausage, sausage pizza, savory, seafood, shrimp, hickory smoke, mesquite smoke, sour, sour cream, sour cream and onion, spearmint, spicy, strawberry, strawberry margarita, jam type strawberry, strawberry-kiwi, burnt sugar, sweet, supersweet, sweet & sour, tallow, tamarind, tangerine-lime, tangerine, tea, tequila type, toffee, triple sec, tropical fruit mix, turkey, tutti frutti, vanilla, vanilla cream, vanilla custard, french vanilla, vegetable, vermouth, vinegar, balsamic vinegar, watermelon, whiskey, wildberry, wine, and yoghurt. Other examples of flavors are found in 21 C.F.R. §§172.510, 172.515, 172.520, 172.530, 172.535, 172.575, 172.580 and 172.585, which are hereby fully incorporated by reference. A variety of food grade flavors are commercially available from Sensient Flavors Inc. in Indianapolis, Ind., Givaudan SA in Cincinnati, Ohio, and International Flavors & Fragrance in New York, N.Y.

The relative amount of the food grade flavors used in the food grade flavored waxes may vary depending on the desired flavor and the intensity of the flavor. In some embodiments, the food grade flavored waxes will typically contain (by weight) from about 10% to about 90% flavor, particularly from about 20% to about 80%, particularly from about 30% to about 70% and more particularly about 40% to about 50%.

The flavor may optionally be combined with a carrier. The carrier may assist in solubilizing some of the food grade flavors. The carrier may include, for example, high boiling single solvents or a mixed solvent system. Desirable characteristics of carriers for flavors include blandness and miscibility with other carriers and flavors. Examples of carriers may include, without limitation, whole or fractionated natural oils, synthetic oils, triacetin, benzyl alcohol, ethanol, propylene glycol, glycerol, vegetable oil, tripropionin, triethyly citrate, tributyrin, or other solvents known in the art. Specific examples may include, without limitation, neobee oil, sunflower oil, soybean oil, corn oil, cottonseed oil, coconut oil, palm kernel oil, safflower oil, canola oil, peanut oil, olive oil, avocado oil, nut oils, walnut oil, rice bran oil, mustardseed oil, camelina oil, chia oil, flaxseed oil, perilla oil, fish oil, palm oil, sesame oil, wheatgerm oil, jojoba oil, palm oil, corn oil, glycerine, water, glycol, hydrogenated oil (partially or fully), or a combination thereof.

When a carrier is used, it is typically present in an amount of at least 5% of the food grade flavored wax. This includes embodiments where a carrier is present in an amount of at least about 25 wt. %, further includes embodiments where a carrier is present in an amount of at least about 50 wt. %, still further includes embodiments where the carrier is present in an amount of at least about 75 wt. %, and even further includes embodiments where the carrier is present in an amount of at least about 99 wt. %. The amount of carrier present, if any, will depend on a variety of factors, including the extent to which the food grade flavors are soluble in the food grade waxes. Thus, some of the food grade flavored waxes may contain a relatively small amount of carrier (e.g. about 5 to 10 wt. %) and others may contain a larger amount of carrier (e.g. about 25 to 50 wt. %). In still other embodiments, the carrier is present in intermediate quantities (e.g. about 50 to 75 wt. %).

The food grade flavored wax may further include a sensation flavor. Sensation flavors may include, without limitation, hot flavors, sour flavors, cool flavors, and combinations thereof.

In addition to the food grade flavors and waxes and any optional carriers, the food grade flavored waxes may comprise other food grade additives such as surface tension modifiers, thickening agents, antioxidants, preservatives, buffering agents, anti-microbial agents, sensates, pearlescents, artificial sweeteners, acidulents, natural sweeteners, miracle fruits, nutrients, vitamins, nutriceuticals, functional foods and combinations thereof. These additional additives may be present in large quantities. For example, these additional food grade additives may be present in amounts of no more than about 70 wt. % of the food grade flavored wax. Alternatively, these additional additives may be present only in small quantities. For example, these additional food grade additives may be present in amounts of no more than about 10 wt. % of the food grade flavored wax. This includes embodiments where the food grade additives are present in amounts of no more than about 5 wt. % and further includes embodiments where the food grade additives are present in amounts of no more than about 3 wt. %. Examples of additives include, without limitation, sodium dioctyl sulfosuccinate, sodium laurel sulfate, sodium laureth sulfate, sugar syrup, potassium tricitrate, hydroxypropyl methylcellulose, carboxymethylcellulose (e.g., Akucell AF1705 from Akzo Nobel), hydroxypropylcellulose (e.g., Klucel EF from Hercules Inc.), butylated hydroxyanisole (BHA), butylated hydroxytoluene (BHT), n-propyl gallate (PG), ascorbic acid (Vitamin C), sodium ascorbate, calcium ascorbate, tocopherols (e.g., extracted from cereals, oilseeds, nuts, and vegetables), spice extracts (e.g., clove, sage, oregano, rosemary, and allspice), methylparaben, propylparaben, sodium benzoate, and citric acid. Additional additives can be found in 21 C.F.R. §172.5, which is hereby fully incorporated by reference. Additives may be used individually or in combination. By adding nutrients to the food grade flavored waxes, the nutrients can be topically applied to edible substrates. This could provide advantages in comparison with add-in nutrients that may lose potency in the processing of the food.

Food grade flavored waxes may also include synthetic dyes, natural dyes, pigments, pearlescent pigments, or combinations thereof. Suitable synthetic dyes for use in the present food grade flavored waxes include food grade FD&C dyes, such as FD&C Red #3, FD&C Red #40, FD&C Yellow #5, FD&C Yellow #6, FD&C Blue #1, and FD&C Green #3, and their corresponding lakes. Suitable natural dyes include, without limitation, turmeric oleoresins, caramel color, cochineal extracts including carminic acid and its corresponding lake, gardenia extracts, beet extracts, and other natural colors derived from vegetable juices, and chlorophyll-containing extracts, such as nettle extract, alfalfa extract and spinach extract. Anthocyanins are another class of food grade dyes that may be used in the food grade flavored waxes. The anthocyanins may be derived from a variety of plant sources, including fruit juices, elderberries, black currants, chokeberries, vegetable juices, black carrots, red cabbage, grapes and grape skins, and sweet potatoes. The use of a pearlescent pigment confers the ability to impart improved pearlescence to edible articles. The pearlescent pigment should be capable of meeting all government approved requirements for human consumption. Suitably, these pearlescent pigments include those pigments having a mica, titanium oxide or iron oxide base. In one embodiment, the pearlescent pigment comprises a micaceous pearlescent pigment, such as those containing mica coated with titanium dioxide, iron oxide, and combinations thereof. Other examples of pearlescent pigments include, but are not limited to, those available under the trade name Candurin® from Merck KGaA and those set forth in PCT publication No. WO 00/03609, the entire disclosure of which is incorporated herein by reference. A non-limiting list of suitable Candurin® pearlescent pigment products include the following: silver fine, silver sheen, silver lustre, silver sparkle, gold shimmer, red shimmer, blue shimmer, green shimmer, gold sheen, light gold, gold lustre, brown amber, orange amber, red amber, red lustre, and red sparkle. Other examples of pearlescent pigments include, but are not limited to, those available under the trade names Bi-Lite®, Cellini®, Chroma-Lite®, Cloisonne®, Cosmica®, Desert Reflections®, Duocrome®, Flamenco®, Gemtone®, Mearlite®, Mearlmaid®, Pearl-Glo®, Reflecks®, Shinju®, and Timica® from the BASF Group (formerly Engelhard Corporation) and those set forth in U.S. Pat. No. 6,627,212 and U.S. Patent Publication No. 2005-0257716, each of which is hereby fully incorporated by reference. Other pearlescent pigments are based on platy titanium dioxide which imparts a distinctive color. Additional pearlescent pigments that may be utilized are available from HebeiOxen (China). Examples of pearlescent pigments from HebeiOxen include, but are not limited to, pigments from the anatase series, including bright silver, fine silver, satin silver, metal silver, intense silver, and super bright silver; pigments from the gold luster series, including, bright brass gold, satin super gold, fine gold, bright orange, flash gold, bright violet gold, bright rose red, satin khaki, and bright khaki; pigments from the rutile series, including, bright silver, fine silver, satin silver, satin gold, bright gold, satin red, bright red, bright red orange, bright violet, satin violet, satin blue, bright blue, satin green, bright green, satin violet, bright violet; pigments from the metal luster series, including, bright brown yellow, bright red, bright violet red, satin violet red, bright violet, satin violet, satin red, bright green, bright brown, metal brown yellow, bright orange red, and satin orange red; pigments from the dyeing series, including satin gray, bright blue, bright yellow, bright green, bright peachblow, and bright violet red; pigments from the polychrome series, including bright super blue, bright blue, bright blue violet, bright blue green, bright green blue, bright green, and bright green yellow; pigments from the weather resistance series, including bright silver, satin silver, bright red, bright violet red, bright blue, and bright green; pigments from the superstrength weatherable series, including blue green, bright green, bright violet, bright blue violet red, and yellow green; pigments from the 9000 series, including bright black and satin black; pigments from the silver white series, including crystal silver, and crystal sparkling silver; pigments from the interference series, including sparkling gold, glowing red, amethyst violet, ultra sparkling blue, and ultra sparkling green; pigments from the gold series, including brass gold; pigments from the iron series, including brown yellow and violet red. Other examples of pearlescent pigments include, but are not limited to, those available under the trade name Covapearl® from Sensient. A non-limiting list of suitable Covapearl® pearlescent pigment products include the following: green 737, light dore 235, antique 236, bright 933, spark silver 937, satin 931, silver 939, red 339, pink 433, and blue 635. Other examples of pearlescent pigments may be found in U.S. Pat. Nos. 5,611,851 and 6,902,609 and U.S. Patent Publication No. 2005-0147724, each of which is hereby fully incorporated by reference. Other pearlescent pigments are based on iron oxide based pigments available from HebeiOxen.

Although the relative amount of the food grade dyes and/or pigments used in the food grade flavored waxes may vary depending on the desired color, shade and intensity, the food grade flavored waxes, when used, will typically comprise at least about 0.01 wt. % (dsb) food grade dye and/or pigment, in others at least about 5.0 wt. % (dsb) food grade dye and/or pigment, and in yet others at least about 10.0 wt. % (dsb) food grade dye and/or pigment. Dyes or pigments are not required. In some embodiments, the food grade flavored waxes comprise less than about 10.0 wt. % (dsb) food grade dye and/or pigment, in others less than about 7.5 wt. % food grade dye and/or pigment, and in yet others less than about 5.0 wt. % (dsb) food grade dye and/or pigment. This includes embodiments where the food grade flavored waxes contain about 0.5 to 7.5 wt. % (dsb), and further includes embodiments where the food grade flavored waxes contain about 0.5 to 5 wt. % (dsb) food grade dye and/or pigment. In another embodiment, the food grade flavored waxes exclude chromic compounds comprising polymerized polyacetylenes.

Additives to food grade flavored waxes may further include lower alcohols (i.e. alcohols having one to six carbon atoms), such as isopropanol, ethanol, n-butyl alcohol, and i-butyl alcohol, or mixtures thereof. The lower alcohols may be used as surface tension modifiers and will generally be present in amounts of no more than about 10 wt. % and more typically about 1 to 5 wt. %. This includes embodiments where the food grade flavored waxes may contain no more that about 3 wt. % lower alcohol and further includes embodiments where the food grade flavored waxes may be substantially free of lower alcohol, such as isopropanol, i.e., contain no more than about 0.5 wt. % lower alcohol.

For some applications it is desirable, but not required, to exclude certain additives. For example, some food grade flavored waxes in accordance with this disclosure may be free of or substantially free of one or more of the following additives: glycol ethers, polyol monoethers, urea, tetraalkylammonium cations (e.g. tetramethylammonium cations), alkanol ammonium compounds (e.g., monoethanol ammonium compounds, diethylammonium compounds, or triethanol ammonium cations), cationic amide compounds (e.g., protonated formamide), silica, sebacyl chlorides, binding agents and film-forming agents. A food grade flavored wax is "substantially free of" an additional food grade additive if the food grade flavored wax contains no more than about 0.5 wt. % of the additional food grade additive. In some instances, the food grade flavored wax contains no more than about 0.2 wt. % of a given additive. In still other instances the food grade flavored wax contains no more than about 0.1 wt. % of a given additive. For example, it may be desirable to have food grade flavored waxes which contain no more than about 0.05 wt. % binding agents and/or film-forming agents, such as polymers, gum arabic, hydrocolloids, xanthum gum, alginates and polysaccharides.

For precision deposition methods, it is generally desirable for the food grade flavored waxes to have a high degree of purity. Impurities can affect the "sprayability" of the food grade flavored waxes and/or the lifetimes of spray marker parts. Inorganic salts, such as sodium chloride and sodium sulfate, are examples of common impurities that may be particularly detrimental to food grade flavored waxes. Food grade flavored waxes having elevated salt contents, whether from the flavor component or elsewhere, may be corrosive to spray marker parts and lead to shorter sprayer lifetimes. Therefore, it is typically advantageous to prepare food grade flavored waxes having a low inorganic salt content, or at least a low chloride and/or sulfate ion content. In some exemplary embodiments, the food grade flavored waxes contain an inorganic salt content, and more specifically in some instances a chloride and/or sulfate ion content, of no more than about 0.5 wt. %. This includes embodiments in which the food grade flavored waxes contain an inorganic salt content, or at least a chloride and/or sulfate ion content, of no more than about 0.2 wt. % and desirably no more than about 0.1 wt. %. The salt (e.g. chloride and or sulfate ion) impurity level in the food grade flavored wax will desirably be no more than about 1000 ppm. In some embodiments, the impurity level will be no more than about 500 ppm and in still other embodiments the impurity level will be no more than about 100 ppm. In some instances it may be possible for the food grade flavored waxes to include higher levels of certain less corrosive salts provided the levels of chlorides and/or sulfates in the food grade flavored waxes remains low. Thus, in certain embodiments, the inorganic salt content and impurity limits cited above may be interpreted to refer specifically to chloride and/or sulfate ion content in the food grade flavored waxes. Other examples of detrimental impurities include surface oils, bulk oils, and suspended solids having particle diameters greater than 5 Mm.

The food grade flavored wax may be made by heating the food grade wax until it is liquefied. The other components are then added to the food grade wax, including flavor, and optionally sweetener, color, and sensation flavor. The liquid solution is kept in suspension by mechanical stirring. The food grade flavored wax is then cooled, which may result in a solid block of food grade flavored wax.

An oil soluble system may reduce volatility and give an immediate release. An encapsulation system could include a basic spray dried system using gums or starches, spray chilled fat encapsulation, coacervation, or multi-layered particles through fluidized bed coating. The encapsulation system may protect from loss of volatiles in the hot wax and may provide a delayed release mechanism.

A method for deposition, and more preferably, precision deposition of food grade flavors and food grade flavored waxes onto edible substrates may be employed. In one embodiment, precision deposition of food grade flavored waxes is accomplished with the use of spraying technology. In one example, the use of USMR Micro-Spray Markers available from UNIVERSAL STENCILING & MARKING SYSTEMS (St. Petersburg, Fla.) is described below as it applies to precision deposition of food grade flavored waxes to edible substrates.

In another embodiment, the food grade flavored waxes may be applied using a printer.

The precision deposition may be used alone to apply one or more food grade flavored waxes to an edible substrate. Additional application of the same or different food grade flavored waxes may be accomplished using the precision deposition technology set forth below. In addition, the food grade flavored waxes may be used in conjunction with flavored fluids such as those set forth in International Publication No. WO 2007/005063 ("the '063 publication") and U.S. application Ser. No. 11/994,164, filed Feb. 17, 2006, each of which is hereby fully incorporated by reference. Printing technology (e.g. ink jet and valve) may be used to apply flavored fluids onto flavored fluids or food grade flavored waxes applied using precision deposition. More typically, however, would be the precision deposition of flavored fluids onto the same or different flavored fluids or food grade flavored waxes applied using the application technologies described herein or in the '063 publication or U.S. application Ser. No. 11/994,164. Various combinations of the precision deposition and printing technologies will be readily ascertainable to those skilled in the art. Additional examples of technology that may be used with the present invention may be found in U.S. application Ser. No. 11/770,678, filed Jun. 28, 2007, which is hereby fully incorporated by reference.

A variety of applications can be used to apply food grade flavored waxes onto an image (e.g. those set forth in U.S. application Ser. No. 10/601,064 filed Jun. 20, 2003, Ser. No. 10/918,197 filed Aug. 13, 2004, and Ser. No. 11/149,660 filed Jun. 10, 2005, each of which is hereby fully incorporated by reference), or, alternatively, images onto the food grade flavored waxes. One example is precision deposition of the food grade flavored waxes. Those skilled in the art will readily ascertain the various combinations of flavored fluids, colored edible fluids, and food grade flavored waxes that can be applied through various combinations of printing technology (e.g. ink jet and valve) and the precision deposition methods described herein.

The food grade flavored waxes can be produced to have characteristics that make them suitable for precision deposition onto the edible substrates described above. Formulations of the present invention may have at least one of the following: food grade ingredients, compatibility with the surfaces of the edible substrates onto which they will be applied, and properties (e.g., viscosities, surface tensions, smear resistance, solubilities, and drying times) that make them suitable for use with ink sprayers, such as the USMR Micro-Spray Markers. In particular, the formulations may be suitable for spraying onto edible substrates using the USMR-20AF Micro-Spray Marker with Adjustable Fluid Control (herein referred to as "the spray marker") illustrated in FIGS. 1-5 and 9. It is to be understood that the use of this particular spray marker is proposed only as an example and any other spraying devices capable of precision deposition may be suitable for this invention. The precision deposition devices set forth below may be used to deposit the food grade flavored waxes disclosed herein as well as the flavored fluids and edible inks incorporated herein by reference.

Figure 1:
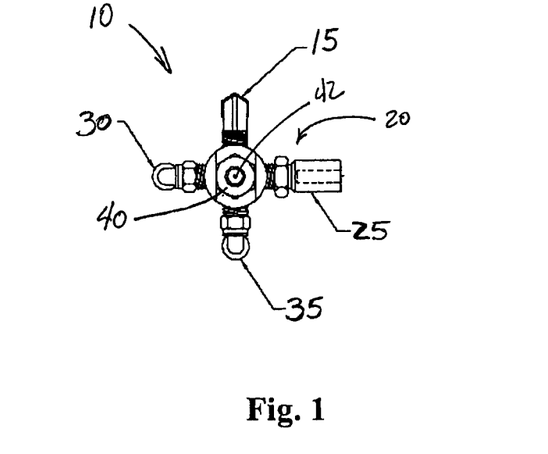
FIG. 1 is a frontal view of a sprayer.

FIG. 1 is a frontal view of a spray marker 10 that includes a liquid receiver 15, a mounting piece 20 with an adaptor 25, a trigger air receiver 30, an atomizer air receiver 35, and a spraying portion 40 having a spraying aperture 42. The liquid receiver 15 is configured to receive food grade flavored wax from a container 45 generally placed above the spray marker 10 (shown in FIG. 3). A mechanical method may be used to stir the molten wax to keep everything in suspension. A container that has a heating element to melt the wax may be used.

In addition, a thermal hose may run between the container and the spray marker to ensure the product remains liquid. The trigger air receiver 30 is configured for the spray marker 10 to receive pressurized air precisely when food grade flavored wax is to be sprayed onto edible substrates. The atomizing air receiver 35 is also configured to receive compressed air used in the process of spraying food grade flavored waxes onto edible substrates. The mounting piece 20 is configured to receive, or be adapted to, any device (e.g., a bracket, mounting plates, screws, or clamps) suitable to mount the spray marker 10 to a desired location for precision deposition. Particularly shown in FIG. 1 is the adaptor 25, which is suitable to receive a mounting shaft (not shown). Other adapters may also be coupled to the spray marker 10 for mounting purposes.

In general, the spray marker 10 can produce round marks or stripe patterns of food grade flavored wax based on the mounting characteristics. A deposition system for spraying food grade flavored wax onto edible substrates may include the spray marker 10 mounted on a static station or on an automated arm. Regardless of the mounting characteristics of the deposition system, applying round marks of food grade flavored wax is generally characterized by controlling the spray marker 10 with relatively short electrical signals. For example, electrical signals for controlling the spray marker 10 may each include a time duration of 100 milliseconds. Generating electrical signals at this rate usually allows the spray marker 10 to apply about 180 round marks per minute onto edible substrates. Longer time duration electrical signals can be generated to extend the time of food grade flavored wax application onto edible substrates generating stripe patterns, when the spray marker 10 moves with respect to edible substrates, or round marks with higher concentration of food grade flavored wax, when the spray marker 10 remains static with respect to edible substrates.

A deposition system can be configured to include the spray marker 10 above-described to apply food grade flavored wax under various conditions based on the time duration of electrical signals controlling the spray marker 10 and the type of mounting of the spray marker 10. For example, the spray marker 10 may be mounted in a static position to apply food grade flavored wax onto various edible substrates moving on a conveyor or endless belt (not shown). It is possible to coordinate the operation of the deposition system with the operation of the conveyor to apply the desired amount of food grade flavored wax on the each piece of the edible substrates. Another example may include the spray marker 10 being mounted onto an automated arm. In this particular case, the automated arm can transport the spray marker 10 to the particular location of the edible substrate.

Figure 2:
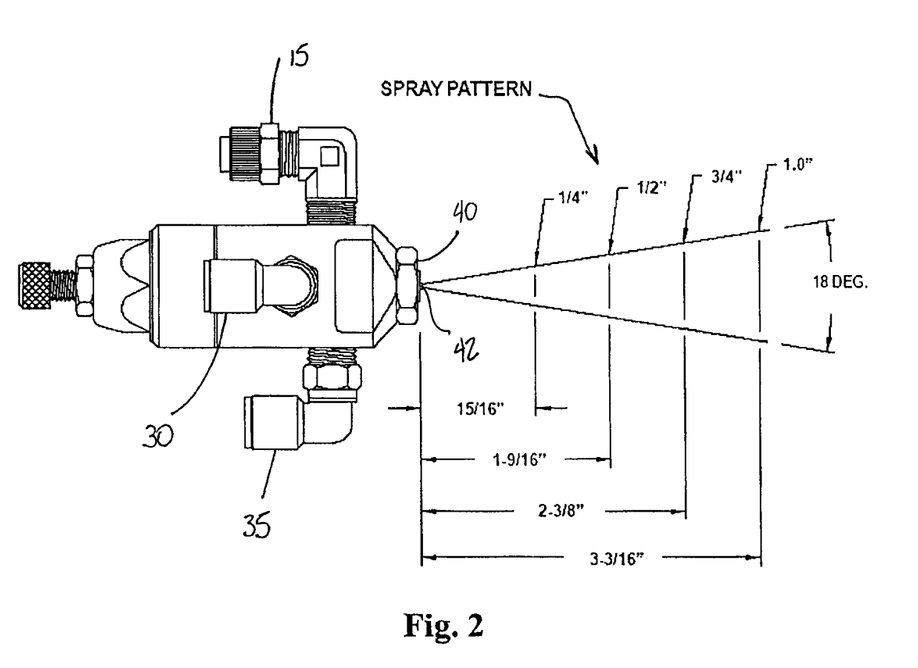
FIG. 2 is a side view of the sprayer in FIG. 1 illustrating a spray pattern.

FIG. 2 shows the spray marker 10 configured to apply food grade flavored wax with a round shape characterized by having an adjustable spot size from about ¼" to about 1". The spray marker 10 generally fires perpendicularly with respect to the edible substrate and with an 18 degree conical spray pattern of food grade flavored wax. Thus, adjusting the spot size or the line width (for longer time duration applications) can be accomplished by positioning the spray marker 10 at the appropriate vertical distance from the surface of the edible substrate, as shown in FIG. 2. A deposition system may be configured to continuously adjust the distance between the spray marker 10 and the edible substrate to control the concentration and amount of food grade flavored wax applied. It is to be understood that adjusting the distance between the spray marker 10 and the edible substrate can be accomplished regardless of the structural characteristic (static or dynamic/automated arm) of the deposition system. It is also to be understood that the spray marker 10 can be mounted at an angle with respect to edible substrates.

It is also possible to adjust the quantity of food grade flavored wax applied onto an edible substrate by controlling the quantity of food grade flavored wax flowing into a compressed air stream supplied through the atomizing air receiver 35. This allows the inclusion of another parameter for controlling the quantity and concentration of food grade flavored wax applied. For that purpose, the trigger air receiver 30 and the atomizing air receiver 35 are generally supplied with compressed air at predetermined pressures. The spray marker 10 generally requires 5-12 PSI atomizing air pressure and 70-80 PSI trigger air pressure. In other embodiments, the pressure of the compressed air supplied to the spray marker 10 through the trigger air receiver 30 and the atomizing air receiver 35 may vary.

Figure 3:
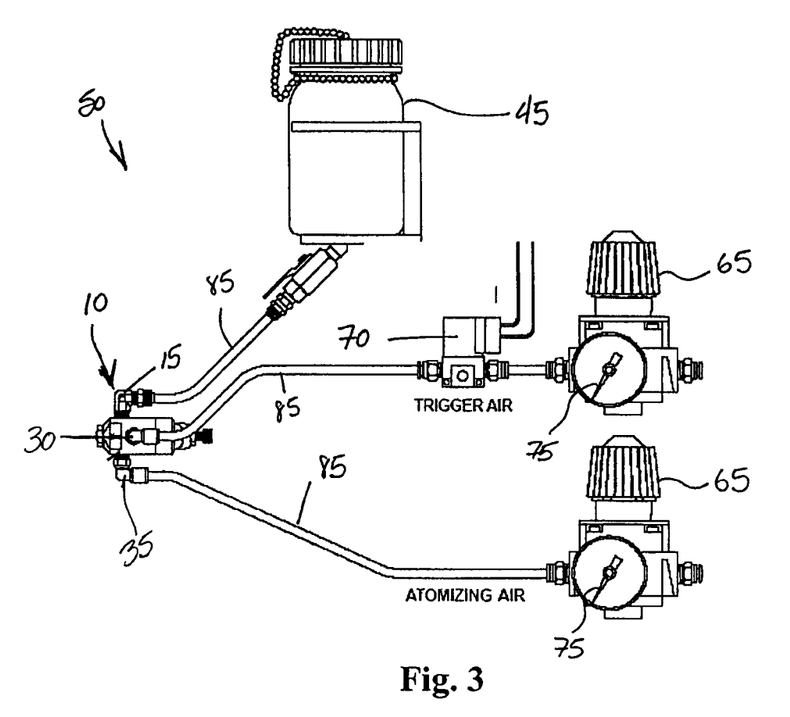
FIG. 3 is a first configuration of a spraying system including the sprayer of FIG. 1.
Figure 4:
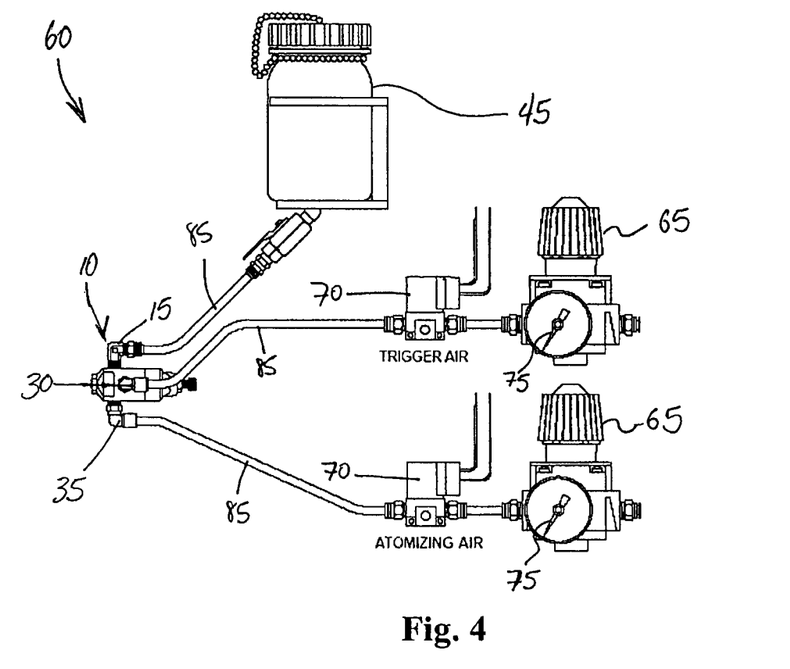
FIG. 4 is a second configuration of a spraying system including the sprayer of FIG. 1.

FIGS. 3-4 show examples of a first deposition system 50 and a second deposition system 60, respectively. The first deposition system 50 and the second deposition system 60 are each characterized by supplying compressed air at 5-12 PSI and 70-80 PSI to the atomizing air receiver 35 and the trigger air receiver 30 of the spray marker 10, respectively. FIGS. 3-4 each show the container 45 for supplying food grade flavored wax to the spray marker 10. In the examples shown, the food grade flavored wax is supplied by the force of gravity to the spray marker 10. It is possible to increase the pressure of the food grade flavored wax by adjusting the height of the container 45 relative to the position of the spray marker 10. A higher elevation of the container 45 with respect to the spray marker 10 can cause a higher volume of food grade flavored wax to be sprayed. In addition, heated/hot air is used for the atomization to ensure the product stays liquid.

Figure 7:
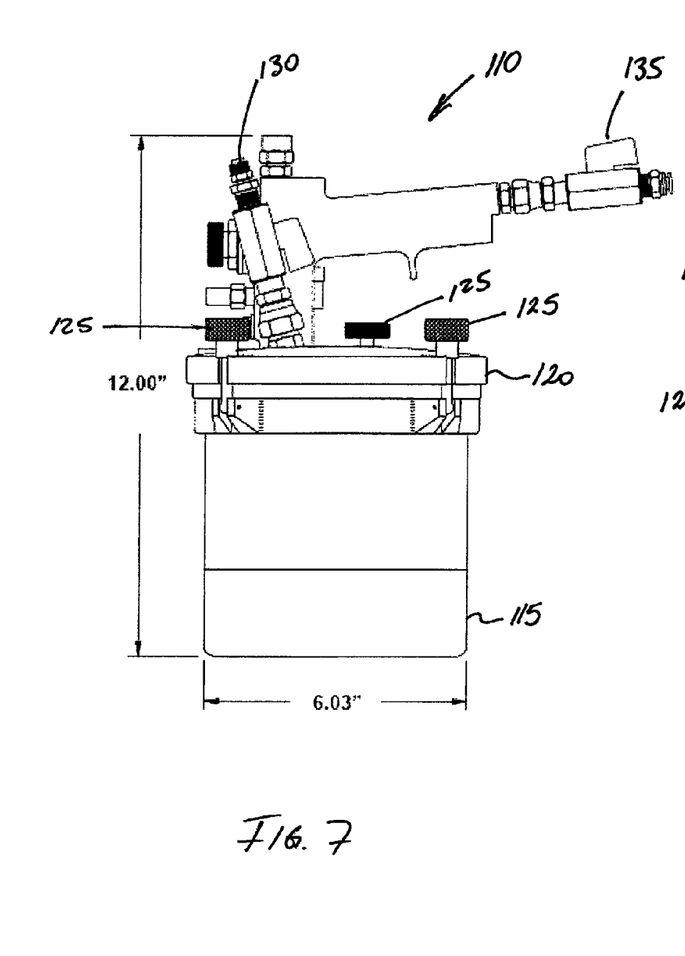
FIG. 7 is a pressure reservoir.
Figure 8:
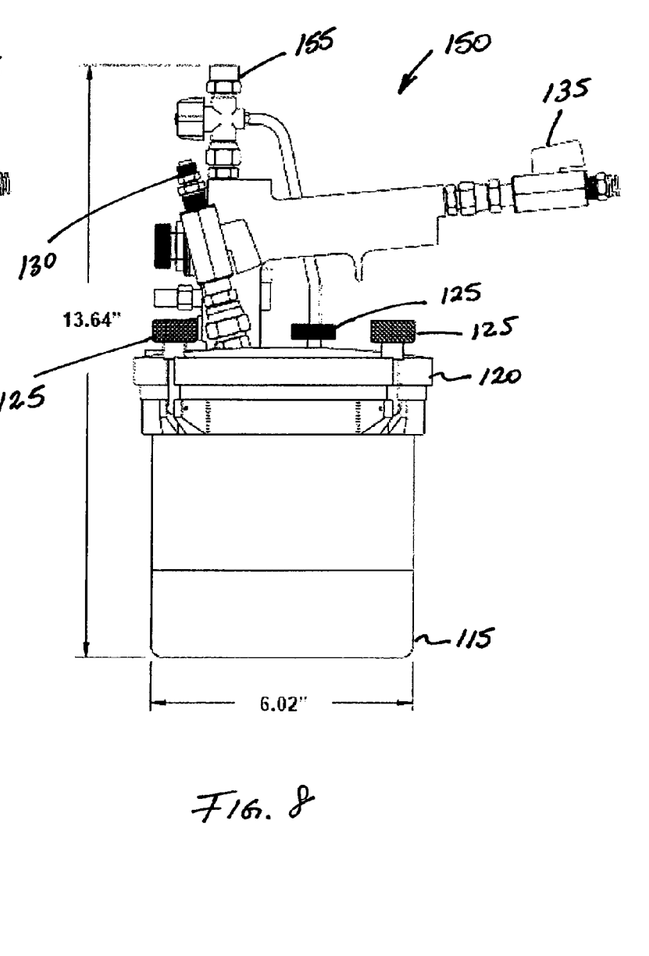
FIG. 8 is an alternative pressure reservoir.

Alternatively, a deposition system such as the first deposition system 50 and the second deposition system 60 can include a pressure reservoir 110, such as the USM-80350 Pressure Reservoir illustrated in FIG. 7. The pressure reservoir 110 includes a canister 115, a lid 120 with coupling mechanisms 125 adapted to maintain a seal between the canister 115 and the lid 120, a first valve 130, and a second valve 135. The first valve 130 and the second valve 135 are operable to dispense the contents supported within the canister 115 and to connect the pressure reservoir 110 to a pressured air line (not shown). One difference between the pressurized reservoir 110 and the container 45 is that the pressure reservoir 110 does not need to be at a higher altitude with respect to the spray marker 10 to supply a pressurized food grade flavored wax. FIG. 8 illustrates a pressure reservoir 150, which is an alternative construction to the pressure reservoir 110 shown in FIG. 7. The pressure reservoir 150 includes the same elements as the pressure reservoir 110 plus an agitation system 155. The agitation system 155 can be pneumatically operated to selectively stir the contents of the pressure reservoir 150. FIGS. 7 and 8 show specific dimensions for the pressure reservoirs 110 and 150. However, it is to be understood that the pressure reservoirs 110 and 150 are only for exemplary purposes and other reservoirs or containers capable of supporting a pressurized food grade flavored wax fall within the scope of the invention.

With respect to FIGS. 3 and 4, pressurized air is supplied to the spray marker 10 by pressurized air reservoirs (not shown) and controlled by pressure regulators 65 and one or two electric solenoid valves 70, respectively. In the case of the deposition system 50, shown in FIG. 3, the solenoid valve 70 controls pressurized air supplied to the trigger air receiver 30. The pressure regulators 65 are configured to release pressured air when a needle 75 marks the proper air pressure. For the first deposition system 50 and the second deposition system 60, the proper air pressure is 70-80 PSI and 5-12 PSI for trigger air pressure and atomizing air pressure, respectively. After mounting the first deposition system 50 and the second deposition system 60 as shown in FIGS. 3 and 4, respectively, the next step is to couple the solenoids 70 to at least one energy source to receive electrical signals for controlling the solenoids 70. In the first deposition system 50 and the second deposition system 60, the atomizing air may flow at full pressure (5-12 PSI) before applying a trigger signal to spray food grade flavored wax.

In some applications, a precision deposition system is configured to apply food grade flavored wax in a continuous manner as to create a stripe of food grade flavored wax. One configuration can include the spray marker 10 mounted on a fixed position while food grade flavored wax is applied to a moving edible substrate. Another configuration can include the spray marker 10 mounted onto a moving arm. Additionally, it is important to understand that the first deposition system 50 and the second deposition system 60 are operable to perform this application. In the case of the first deposition system 50 including one solenoid 70, the length of the stripe of food grade flavored wax is at least in part determined by the length of time an electrical signal is applied to the solenoid 70 controlling the trigger air. It is assumed under these conditions that the atomizing air pressure remains substantially constant, or at least at the appropriate range of air pressure, throughout the deposition process.

One way to supply an electrical signal for controlling the solenoid 70 is by using a One-Shot Timer (not shown) coupled to the solenoid 70. The One-Shot Timer can provide an adjustable time duration signal to the solenoid 70 controlling the trigger air each time the spray marker 10 needs to be fired. It is usually preferred to supply a 100 millisecond signal, though the One-Shot Timer may be adjusted to generate electrical signals with a time duration between about 0.05 and about 1 seconds. In the case of the second deposition system 60 shown in FIG. 4, the solenoids 70 are generally energized with a sequence of electrical signals to provide and maintain atomizing air pressure at the appropriate pressure when the trigger air pressure is applied. A One-Shot Timer may also be used in the second deposition system 60 by wiring the two solenoids 70 to the One-Shot Timer, where the solenoids 70 are in a parallel configuration. This configuration is characterized by supplying electrical signals to the solenoids 70 of the second deposition system 60 simultaneously.

Figure 5:
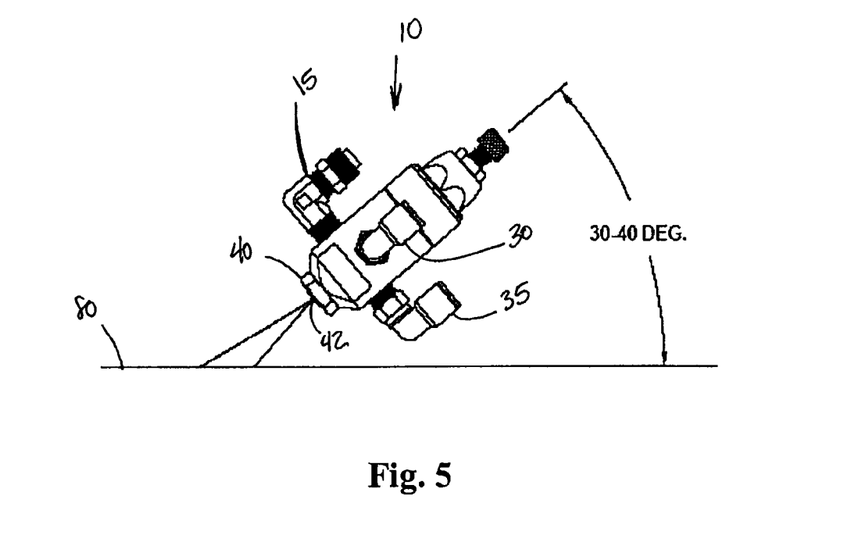
FIG. 5 is the sprayer of FIG. 1 mounted at an angle.

The first deposition system 50 and the second deposition system 60 shown in FIGS. 3 and 4, respectively, are only schematic representations and do not illustrate the angle at which food grade flavored wax is applied to edible substrates. Generally, the spray marker 10 is mounted substantially perpendicular to the edible substrate. In the applications where it is desired to apply a stripe of food grade flavored wax, it is normally recommended that the spray marker 10 be mounted at an angle between about 30 degrees and about 45 degrees with respect to a surface 80 supporting the edible substrate, as indicated in FIG. 5. Mounting the spray marker 10 at an angle instead of perpendicular to the surface 80, generally results in a sharper edge definition by minimizing the feathering of the spray pattern. If the spray marker 10 is mounted statically in the position shown in FIG. 5, the spray marker 10 produces an elliptical mark rather than a circular mark.

Some other applications of the first deposition system 50 and the second deposition system 60 generally include spot marking, which is characterized by the spray marker being controlled to apply a relatively small spot mark of food grade flavored wax to an edible substrate, which may be in motion.

In this type of application, the amount of food grade flavored wax deposited is dependent of factors including the time duration of the electrical signal controlling the solenoids 70, adjustment of the spraying aperture 42, and the velocity at which the edible substrate is moving. For example, when applying food grade flavored wax in the form of spot marking to fast moving edible substrates, an approximate spray duration of 100 milliseconds may result in a short line mark and not a round spot. As a general guideline for the spray marker 10, the spot is elongated by an amount approximately equal to the distance the edible substrate travels in 1/10 of a second. For example, if the edible substrate is traveling at 12 inches per second, the spot would be elongated to a line of food grade flavored wax of approximately 1.2 inches in length.

Figure 6:
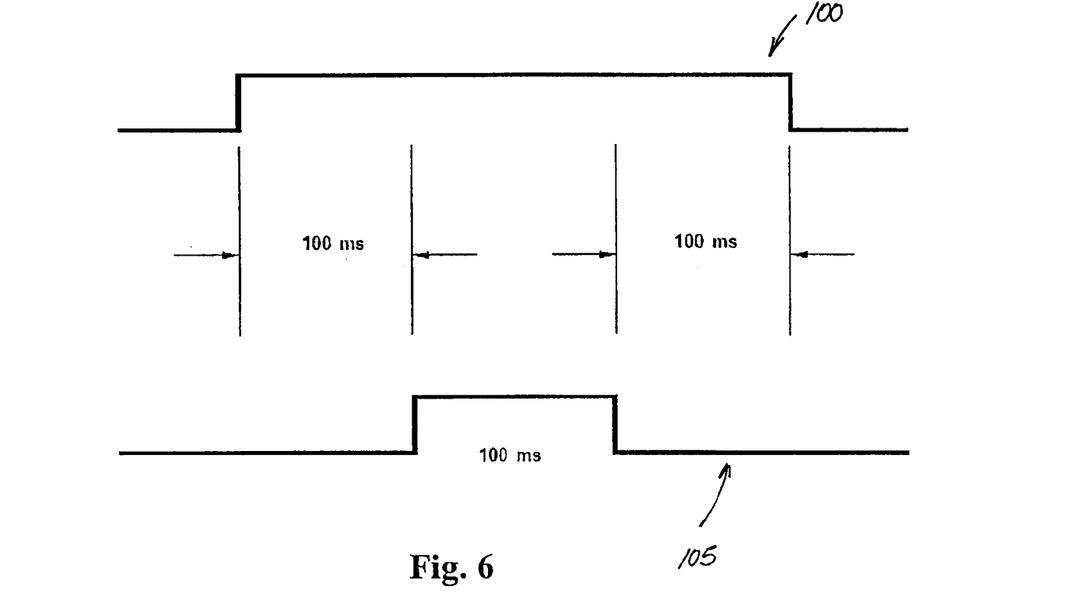
FIG. 6 shows two control signals to operate a spraying system.

Some of the applications for spot marking edible substrates can include the use of the second deposition system 60 shown in FIG. 4. More specifically, the second deposition system 60 may include a controller having two variable outputs to effectively control the solenoids 70 supplying pressured air to the spray marker 10. In particular, each solenoid 70 of the second deposition system 60 can be coupled to one of the variable outputs of the controller to receive electrical signals in a specific sequence. When using the controller to generate electrical signals to control the solenoids 70 of the second deposition system 60, the solenoid supplying atomizing air can be energized first to allow time for the relatively lower pressure atomizing air to flow at full volume through the receiver 35 of the spray marker 10. The amount of time for this to occur depends in part on the length of connecting tubes 85 containing atomizing air but typically 50-100 milliseconds is an adequate delay before energizing the solenoid 70 controlling trigger air. The solenoid 70 controlling trigger air is then energized for approximately 100 milliseconds. After the solenoid 70 controlling trigger air is de-energized, the atomizing air is generally allowed to continue flowing for another 50-100 milliseconds to ensure all food grade flavored wax residue is blown off the spraying portion 40 of the spray marker 10. A typical pulse sequence generated by the controller is shown in FIG. 6. More specifically, a signal 100 exemplifies the electrical signal supplied to the solenoid 70 controlling atomizing air, and a signal 105 exemplifies the electrical signal supplied to the solenoid 70 controlling trigger air. FIG. 6 shows approximate 100 millisecond delay signals and trigger signal, though other embodiments may include different time durations for delay signals and trigger signals based on the amount of food grade flavored wax to be sprayed.

Figure 9:
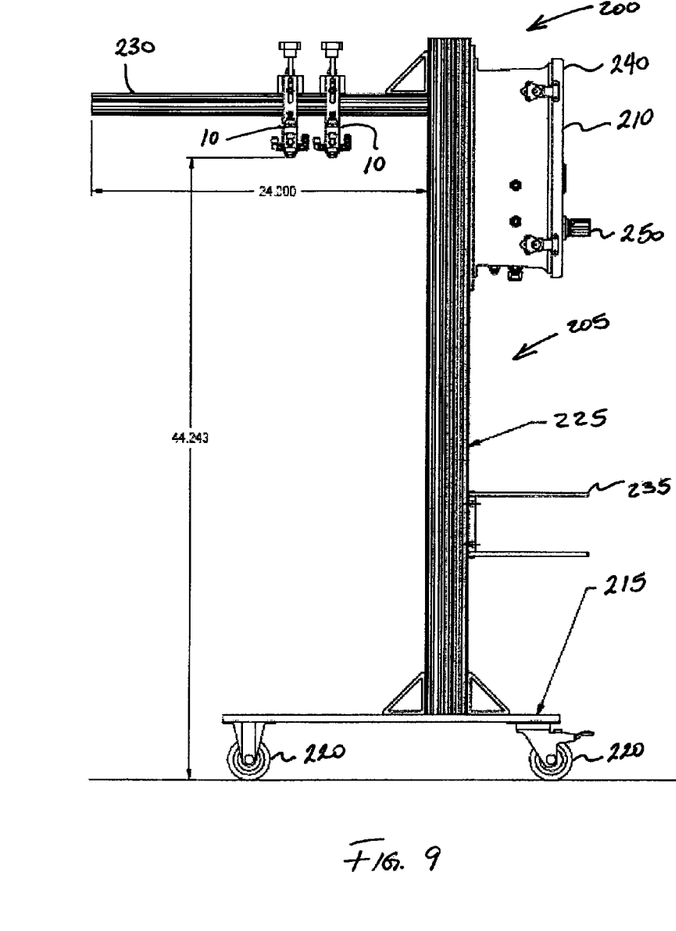
FIG. 9 is a side view of a third configuration of a spraying system.
Figure 10:
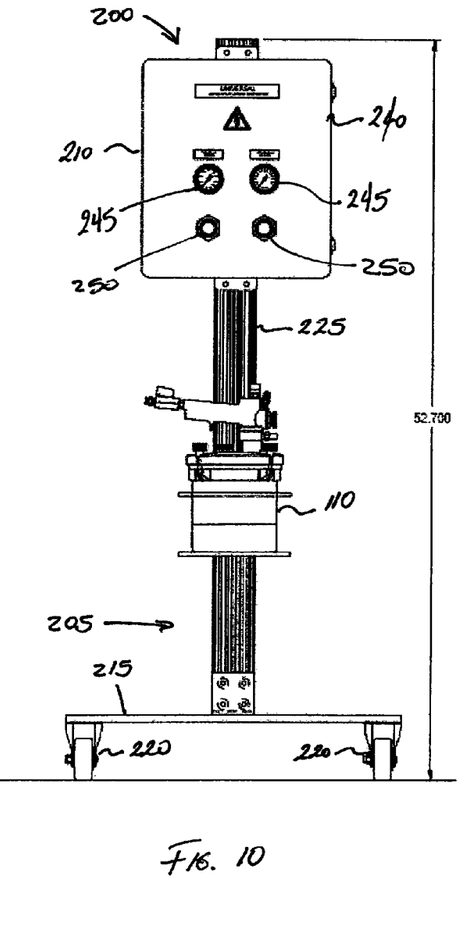
FIG. 10 is a frontal view of the spraying system shown in FIG. 9.

FIGS. 9 and 10 illustrate an exemplary construction of a third deposition system 200. The deposition system 200 includes a movable frame 205, a controller 210, a pressure reservoir 110 and two spray markers 10 mounted onto the movable frame 205. The movable frame 205 includes a substantially horizontal bottom plate 215 supported by a set of wheels 220 that allow the deposition system 200 to be transported to a desired location. The movable frame 205 also includes a substantially vertical extrusion 225 and a support bar 230. The vertical extrusion 225 supports a coupling mechanism 235 to couple the pressure reservoir 110 to the movable frame 205, and also supports the controller 210. The support bar 230, the controller 210, and the coupling mechanism 235 are operable to be adjusted in high along the vertical extrusion 225 based on the desired application of the deposition system 200.

The controller 210 of the deposition system 200 includes a cabinet or case 240 supporting pressure gauges 245 generally indicating the trigger pressure and the atomizing pressure related to the sprayers 10 coupled to the support bar 230. The cabinet 240 also supports valves 250 operable to fluidly connect to the trigger air receiver 30 and the atomizer air receiver 35 of each of the sprayers 10. The support bar 230 supports two sprayers 10, which can be adjusted along the support bar 230 based on the application of the deposition system 200. The support bar 230 is shown aligned substantially perpendicular to the vertical extrusion 225 and the sprayers 10 aligned for vertical deposition. However, the support bar 230 and the sprayers 10 can be adjusted with respect to the vertical extrusion 225 to supply a food grade flavored wax at other desired angles of deposition. It is to be understood that the third deposition system 200 shown in FIGS. 9 and 10 is only for illustration purposes. Other deposition systems can include a different number of sprayers 10 and a different configuration allowing such deposition systems to be movable and adjustable similar to the deposition system 200.

An edible substrate having any one of the above-described food grade flavored waxes applied to one or more surfaces thereof is also provided.

EXAMPLES

Exemplary embodiments of the present food grade flavored waxes are provided in the following examples. The following examples are presented to illustrate the present food grade flavored waxes and methods for applying the food grade flavored waxes to edible substrates and to assist one of ordinary skill in making and using the same. The examples are not intended in any way to otherwise limit the scope of the invention.

Instrumentation and Measurements

Physical characteristics of the food grade flavored waxes are measured as follows. Viscosity measurements are obtained using a Brookfield Programmable LVDV II$^+$Digital Calculating Viscometer and a Brookfield DV III Rheometer Model V3.3LV with ULA spindle manufactured by Brookfield Engineering Laboratories, Inc., Middleboro, Mass. Surface tension measurements are made using the DuNuoy Ring tensiometer method. The DuNuoy Ring tensiometer (Fisher Model 20 manual DuNuoy Ring Tensiometer or CSC Model 70535) may be obtained from Fisher Scientific or CSC Scientific Co., Fairfax, Va. or from companies such as Cole Palmer or VWR. Absorbance measurements are obtained with a Perkin Elmer Lambda 2 UV/Visible Spectrometer. Specific gravity is measured with a weight per gallon cup which meets ASTM methods. A weight per gallon cup accommodates 8.321 grams of water at 77.0° F. (25° C.). The apparent pH values are read directly from an Orion Model 420A electronic pH meter with an Orion 91-55 electrode, after calibrating the instrument with appropriate buffers and immersing the electrode into the food grade flavored waxes.

SDI measurements are obtained using a modified ASTM D4189-82 protocol for SDI of water. SDI testing is a method that relates the rate of membrane plugging or clogging to the quantity of particulate matter in the food grade flavored wax. In the modified procedure, designated "Heat Test SDI" in the tables, a stainless steel filter funnel (25 mm, 50 ml bowl capacity) is placed over a 250 ml filter flask hooked up to a vacuum and a vacuum gauge. A Pall Versapor® 25 mm, 0.45 µm membrane filter disk is placed in the filter funnel and pre-moistened with a few drops of the food grade flavored wax to be tested. The vacuum pressure is set to 23 in. of mercury. The food grade flavored wax to be tested is heat aged for 11 days at 70° C. Heat-aging is not necessary to determine the SDI of the food grade flavored wax. SDI may be measured substantially immediately after the food grade flavored wax is prepared. In these experiments, the food grade flavored waxes are heat-aged in order to test the shelf life of the food grade flavored waxes. A high SDI index after the aging process indicates that significant particle formation does not occur and indicates a long shelf life for the food grade flavored waxes.

After heat-aging, 20 ml of the heat-aged food grade flavored wax to be tested is poured into the filter funnel and a stopwatch (with a resolution of hundredths of a second) is used to measure the time required for the food grade flavored wax to pass through the filter. This time is recorded as "$T_1$." A 160 ml aliquot of the heat-aged food grade flavored wax to be tested is then poured into the filter funnel and allowed to pass through the filter. Although the time required for this second aliquot to pass through the filter need not be recorded, it is designated "$T_2$." Next, a second 20 ml aliquot of the heat-aged food grade flavored wax to be tested is poured into the filter funnel and the time required for the food grade flavored wax to pass through the filter is measured with the stopwatch. This time is recorded as "$T_3$." SDI is then calculated by dividing $T_1$ by $T_3$.

Example 1

Preparation of Precision Deposition Food Grade Flavored Waxes

This example describes a method for producing non-aqueous food grade flavored waxes from food grade flavors. Two illustrative waxes and flavors for these waxes are described. The food grade flavored waxes were prepared as follows. The amount of each component making up the food grade flavored wax is given in wt. %.

Stepan® EDS (available from Stepan Company) was heated to liquefy it by heating a safe container on a hot plate. It was heated slowly to the melting point of the material. An oil-soluble strawberry flavor (available from Sensient Flavors Inc., Indianapolis, Ind.) was added to Stepan® EDS (available from Stepan Company) in an amount of 10% by weight of EDS.

Carnauba wax was heated to liquefy it by heating it in a safe container on a hot plate. It was heated slowly to the melting point of the material. An oil-soluble strawberry flavor (available from Sensient Flavors Inc., Indianapolis, Ind.) was added to Carnauba wax in an amount of 10% by weight of wax.

Example 2

Stepan® EDS (available from Stepan Company) is heated to liquefy it. Color is added, along with a flavor extract (as set forth in Example 1) and a sweetener system consisting of an acid, sugar, or other artificial sweetener. In contrast to Example 1, this example contains an entire flavor profile. Flavor is added, as well as a sweetener system that imparts an acidic note and a sweet note to the material. The mixture is allowed to cool and harden.

Example 3

Prophetic

Application of Food Grade Flavored Waxes to an Edible Substrate

Food grade flavored waxes can be deposited through the use of spray markers such as USMR Micro-Spray Markers (available from UNIVERSAL STENCILING & MARKING SYSTES, St. Petersburg, Fla.). A spray marker may apply one or more food grade flavored waxes. For example, one or more food grade flavored waxes can be applied onto a substrate to produce a variety of images and patterns. Substrates such as cookies, crackers, breads, marshmallows, gum, tortillas, and other edible items in a wide variety of shapes and thickness may be used.

Spray marking provides the ability to precisely deposit a secondary flavor or sensory experience onto an edible substrate (e.g., processed, snack, savory, sweet, candy, gum, etc.) that enhances the consumer's eating experience. This precision deposition delivers advantages other methods of flavor application do not, including specific area application, less waste, and flexibility (e.g., a multi-pack of a product can house a different flavor/sensory experience with each product contained therein).

Food grade flavored waxes can be formulated for a variety of end uses. In one embodiment, the food grade flavored wax may impart one or more flavors to a substrate in either a random or predetermined pattern using a spray marker. In another embodiment, the food grade flavored wax may enhance the primary flavor of the edible substrate, such as spraying chocolate flavor on a chocolate snack cake. In yet another embodiment, the food grade flavored wax may provide a flavor different from the primary flavor of the edible substrate, such as spraying strawberry flavor on chocolate. In a further embodiment, the food grade flavored wax may provide surprise impact, such as printing hot or sour flavors on a salty snack.

In an additional embodiment, the food grade flavored waxes may impart a flavor image to the substrate using a spray marker. A flavor image may combine taste appeal with visual appeal by spraying food grade flavored waxes having both a flavor component and a color component. One or more food grade flavored waxes can be sprayed onto a substrate to produce a variety of images and patterns exhibiting one or more flavors and colors. The flavor component may have a direct correlation to the image, such as the image of an jalapeno pepper having a jalapeno flavor, or be completely unrelated, such as the image of a grape having a cinnamon flavor. In a further embodiment, the flavor components and color components are in separate waxes. Food grade flavored waxes contain one or more flavor components. Colored waxes contain one or more colored components. Food grade colored fluids suitable for producing images on substrates can be found in U.S. application Ser. No. 10/601,064 filed Jun. 20, 2003, Ser. No. 10/918,197 filed Aug. 13, 2004, and Ser. No. 11/149,660 filed Jun. 10, 2005, each of which is hereby fully incorporated by reference. The flavor image is produced by applying at least one food grade flavored wax and at least one colored fluid onto a substrate either simultaneously or sequentially. When the food grade flavored wax and fluid are applied sequentially, either the colored fluid or the food grade flavored wax may be applied first. The food grade waxes and fluids may be applied onto the substrate in either a random or predetermined pattern using a spray marker. Applying the food grade waxes and fluids may be done using printing, spraying, or combinations thereof.

Examples of the various embodiments include: applying sweet, sour, hot, spicy or honey flavors on a potato chip; applying strawberry, chocolate or citrus flavors on snack cakes; applying sweet, sour, cool or mint flavors on candy products; applying smoky, barbeque, spicy or wasabi on processed food products; applying a bacon flavor onto a dog treat; applying a cheese flavor onto one-half of a cracker and a garlic flavor onto the other one-half of the cracker; applying a strawberry flavor onto one-third of an ice cream bar, a chocolate flavor onto another one-third of the ice-cream bar, and a vanilla flavor onto the remaining one-third of the ice-cream bar; applying a mystery flavor (e.g., apple flavor) onto a colorless, gelatin-based roll-up; applying a strawberry flavor and the image of a strawberry onto a cookie; applying a spicy hot flavor and the image of a volcano onto a slice of bologna; applying a sour cream & onion flavor and the image of a jalapeno pepper onto a potato chip; and applying a spearmint flavor and a green leaf onto a piece of chewing gum.

In some embodiments, the food grade flavored waxes (or flavor images) are used to enhance or alter the flavor of the edible substrate. For example, a strawberry flavor wax is applied to a snack cake. When the consumer eats the snack cake, he senses the strawberry flavor as part of consuming the edible substrate. In other embodiments, the food grade flavored waxes (or flavor images) are used to provide a secondary sensory experience. The consumer licks the food grade flavored wax (or flavor image) off the edible substrate prior to its consumption. The food grade flavored wax (or flavor image) provides a secondary flavor that is separate from any flavor associated with eating the substrate. In yet other embodiments, the food grade flavored waxes (or flavor images) are used to provide a secondary flavor and enhance the flavor of the edible substrate.

Example 4

Prophetic

Application of a Secondary Food Grade Flavored Wax to an Edible Substrate

In reference to Example 3, food grade flavored waxes can be sprayed through commercially available spraying equipment and subsequently a second food grade flavored wax can be applied by precision deposition. Substrates such as cookies, crackers, breads, marshmallows, gums, and tortillas, and other edible items in a wide variety of shapes and thicknesses may be sprayed with a first food grade flavored wax and sprayed with a second food grade flavored wax to add another flavor experience.

In some embodiments, a sprayer, such as A USMR Micro-Spray Marker (available from UNIVERSAL STENCILING & MARKING SYSTEMS, St. Petersburg, Fla.), imparts one or more food grade flavored waxes to a substrate. In these applications, the sprayer may apply one or more food grade flavored waxes different from the ones first imparted by the sprayer. For example, one or more food grade flavored waxes can be applied with the spray marker onto a substrate to produce a variety of images and patterns and the spray marker can apply an additional food grade flavored wax related to the image or complementary to the image. One example includes spraying the image of a jalapeno pepper and spraying or precision depositing a jalapeno flavor. The flavor component may have a direct correlation to the image, such as the image of the jalapeno pepper having a jalapeno flavor, or be completely unrelated, such as the image of a grape having a cinnamon flavor. Another example includes spraying an image of a strawberry and spraying or precision depositing a chocolate flavor on the printed image, or a portion thereof.

Example 5 Prophetic

Stepan® EDS (available from Stepan Company) is heated to liquefy it by heating it on a hot plate slowly to reach its melting point. A mixer is used to add a dye emulsion or a food grade lake (FD&C Blue No. 1 Lake, FD&C Red No. 40 Lake, FD&C Blue No. 2 Lake, FD&C Yellow No. 5 Lake, FD&C Yellow No. 6 Lake, or Carmine Lake provided by Sensient Food Colors). This mixing is done under high shear while the product remains on the hot plate. A lemon flavor extract is added, along with a sweetener system consisting of an acid, sugar, or other artificial sweetener. The sweetener system contains 10% sugar, 5% flavor, and 1% acid. The mixture is poured onto a heat safe material, such as a marble candy cooking block and allowed to cool to room temperature. At this temperature, it is hard and can be broken into pieces.

The invention has been described with reference to very specific and illustrative embodiments. However, it should be understood that many variations and modifications may be made while remaining within the spirit and scope of the invention.

What is claimed is:

1. A method of imparting flavor to an edible substrate comprising precision depositing a first food grade flavored wax onto a surface of an edible substrate, wherein the first food grade flavored wax comprises:
   a) about 1% to about 85% of food grade wax;
   b) about 10% to about 90% by weight of a food grade flavor;
   c) at least about 5% of a carrier selected from the group consisting of whole natural oils, fractionated natural oils, synthetic oils, triacetin, benzyl alcohol, ethanol, propylene glycol, glycerol, vegetable oil, tripropionin, triethyl citrate, tributyrin, and combinations thereof; and
   d) optionally comprises a sweetener or a food grade thickener.

2. The method of claim 1, wherein the first food grade flavored wax further comprises a color, thereby imparting color to the edible substrate.

3. The method of claim 1, further comprising precision depositing a second food grade colored wax onto the surface of the edible substrate.

4. The method of claim 1, further comprising precision depositing a second food grade flavored wax onto the substrate, the second food grade flavored wax having a different flavor than the first food grade flavored wax.

5. The method of claim 1, wherein the edible substrate has a flavor which is the same as the first food grade flavored wax, and the first food grade flavored wax intensifies the flavor of the edible substrate.

6. The method of claim 1, wherein the edible substrate has a flavor different from the first food grade flavored wax.

7. The method of claim 1, wherein the precision deposition applies the food grade flavored wax in a round shape, in a stripe, or combinations thereof.

8. The method of claim 1, wherein the precision deposition applies the food grade flavored wax using spot marking.

9. The method of claim 1, wherein the first food grade flavored wax further comprises a color and the precision deposition of the first food grade flavored wax forms an image.

10. The method of claim 9, wherein the food grade flavor correlates with the image.

11. The method of claim 9, wherein the food grade flavor does not correlate with the image.

12. The method of claim 1, wherein the wax comprises at least one of a natural, a vegetable, and a synthetic wax.

13. The method of claim 12, wherein the wax comprises at least one of an astor wax, a beeswax (white), a beeswax (yellow), a candelilla wax, a carnauba wax, a castor wax, a glyco wax, a paraffin wax, a petroleum wax, a rice bran wax, a stearin, a stearic acid, a stearic acid esters of erythritol wax, an erythritol distearate wax, and combinations thereof.

14. The method of claim 1, wherein the food grade flavored wax comprises about 10 to about 70 by weight of components other than food grade wax.

15. The method of claim 14, wherein the components other than food grade wax comprise at least one of colors, sweeteners, acids, carriers, surface tension modifiers, thickening agents, antioxidants, preservatives, buffering agents, anti-microbial agents, sensates, pearlescents, artificial sweeteners, acidulents, natural sweeteners, miracle fruits, nutrients, vitamins, nutraceuticals, functional foods, alcohols, and combinations thereof.

16. The method of claim 1, wherein the food grade flavor is selected from the group consisting of almond, amaretto, apple, green apple, apple-cherry-berry, apple-honey, apricot, bacon, balls of fire, banana, barbeque, beef, roast beef, beef steak, berry, berry blue, birch beer/spruce beer, blackberry, bloody mary, blueberry, boysenberry, brandy, bubble bum, butter, butter pecan, buttermilk, butterscotch, candy corn, cantaloupe, cantaloupe lime, caramel, carrot, cassia, caviar, celery, cereal, champagne, cherry, cherry cola, cherry maraschino, wild cherry, black cherry, red cherry, cherry-cola, chicken, chocolate, chocolate almond, cinnamon spice, citrus, citrus blend, citrus-strawberry, clam, cocoa, coconut, toasted coconut, coffee, coffee almond, cola, cola-vanilla, cookies & cream, cool, cotton candy, cranberry, cranberry-raspberry, cream, cream soda, dairy type cream, creme de menthe, cucumber, black currant, dulce de leche, egg nog, pork fat, type fat, anchovy fish, herring fish, sardine fish, frankfurter, fiery hot, fried garlic, sauteed garlic, gin, ginger ale, ginger beer, graham cracker type, grape, grape grapefruit, grapefruit-lemon, grapefruit-lime, grenadine, grill, guarana, guava, hazelnut, honey, hot, roasted honey, ice cream cone, jalapeno, key lime, kiwi, kiwi-banana, kiwi-lemon-lime, kiwi-strawberry, kola champagne, lard type, lemon, lemon custard, lemonade, pink lemonade, lemon-lime, lime, malt, malted milk, mango, mango-pineapple, maple, margarita, marshmallow, meat type, condensed milk, cooked milk, mint, mirepoix, mocha, mochacinna, molasses, mushroom, sauteed mushroom, muskmelon, nectarine, neopolitan, green onion, sauteed onion, orange, orange cordial, orange creamsicle, orange creme, orange peach mango, orange strawberry banana, creamy orange, mandarin orange, orange-passion-guava, orange-pineapple, papaya, passion fruit, peach, peach-mango, peanut, roasted peanut, pear, pecan danish type, pecan praline, pepper, peppermint, pimento, pina colada, pina colada/pineapple-coconut, pineapple, pineapple-orange, pistachio, pizza, pomegranate, pork fat type, baked potato, prune, punch, citrus punch, tropical punch, cherry fruit punch, grape punch, raspberry, black raspberry, blue raspberry, red raspberry, raspberry-blackberry, raspberry-ginger ale, raspberry-lime, roast type, root beer, rum, sangria, sarsaparilla, sassafras, sausage, sausage pizza, savory, seafood, shrimp, hickory smoke, mesquite smoke, sour, sour cream, sour cream and onion, spearmint, spicy, strawberry, strawberry margarita, jam type strawberry, strawberry-kiwi, burnt sugar, sweet & sour, tallow, tamarind, tangerine-lime, tangerine, tea, tequila type, toffee, triple sec, tropical fruit mix, turkey, tutti frutti, vanilla, vanilla cream, vanilla custard, french vanilla, vegetable, vermouth, vinegar, balsamic vinegar, watermelon, whiskey, wildberry, wine, yoghurt and combinations thereof.

17. The method of claim 1, wherein the carrier is selected from the group consisting of neobee oil, sunflower oil, soybean oil, corn oil, cottonseed oil, coconut oil, palm kernel oil, safflower oil, canola oil, peanut oil, olive oil, avocado oil, nut oils, walnut oil, rice bran oil, mustardseed oil, camelina oil, chia oil, flaxseed oil, perilla oil, fish oil, palm oil, sesame oil, wheatgerm oil, jojoba oil, palm oil, corn oil, glycerine, water, glycol, partially hydrogenated oil, fully hydrogenated oil, or a combination thereof.

18. The method of claim 1, wherein the sweetener is selected from the group consisting of sugar, artificial sweetener, and combinations thereof.

19. The method of claim 1, wherein the food grade thickener is selected from the group consisting of sugar syrup, potassium tricitrate, hydroxypropyl methylcellulose, carboxymethylcellulose, hydroxypropylcellulose, a polyglycerol ester, xanthan gum, gellan gum, a carrageenan, a pectin, locust bean, guar, gum Arabic, an alginate, gelatin, microcrystalline cellulose, and combinations thereof.

20. The method of claim 1, wherein the food grade flavored wax comprises about 1% to about 80% food grade wax.

21. The method of claim 1, wherein the food grade flavored wax comprises about 20% to about 80% food grade wax.

22. A method of providing a flavored image on an edible substrate, the method comprising:
   ink jet printing a food grade colored fluid on an edible substrate to create an image; and applying a food grade flavored wax onto the edible substrate, wherein the food grade flavored wax comprises:
   a) about 1% to about 85% of food grade wax;
   b) about 10% to about 90% by weight of a food grade flavor;
   c) at least about 5% of a carrier selected from the group consisting of whole natural oils, fractionated natural oils, synthetic oils, triacetin, benzyl alcohol, ethanol, propylene glycol, glycerol, vegetable oil, tripropionin, triethyl citrate, tributyrin, and combinations thereof; and
   d) optionally comprises a sweetener or a food grade thickener.

23. The method of claim 22, wherein applying comprises precision depositing the food grade flavored wax.

24. The method of claim 23, wherein precision depositing comprises applying the food grade flavored wax in a round shape, a stripe, or combinations thereof.

25. The method of claim 23, wherein precision depositing comprises applying the food grade flavored wax using spot marking.

26. The method of claim 22, wherein the food grade flavored wax comprises about 1% to about 80% food grade wax.

27. The method of claim 22, wherein the food grade flavored wax comprises about 20% to about 80% food grade wax.

28. A method of imparting flavor to an edible substrate, the method comprising:
   applying a food grade flavored wax onto the edible substrate, wherein the food grade flavored wax comprises:
   a) about 1% to about 85% of food grade wax;
   b) about 10% to about 90% by weight of a food grade flavor;
   c) at least about 5% of a carrier selected from the group consisting of whole natural oils, fractionated natural oils, synthetic oils, triacetin, benzyl alcohol, ethanol, propylene glycol, glycerol, vegetable oil, tripropionin, triethyl citrate, tributyrin, and combinations thereof; and
   d) optionally comprises a sweetener or a food grade thickener; and
   applying a food grade flavored fluid onto the edible substrate.

29. The method of claim 28, wherein the food grade flavored wax comprises about 1% to about 80% food grade wax.

30. The method of claim 28, wherein the food grade flavored wax comprises about 20% to about 80% food grade wax.

* * * * *